United States Patent
Shah et al.

(10) Patent No.: US 11,687,492 B2
(45) Date of Patent: Jun. 27, 2023

(54) SELECTIVE DATA DEDUPLICATION IN A MULTITENANT ENVIRONMENT

(71) Applicant: International Business Machines Corporation, Armonk, NY (US)

(72) Inventors: Komal Shailendra Shah, Pune (IN); Bharti Soni, Pune (IN); Tej Parkash, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 17/352,483

(22) Filed: Jun. 21, 2021

(65) Prior Publication Data
US 2022/0405251 A1    Dec. 22, 2022

(51) Int. Cl.
*G06F 7/00* (2006.01)
*G06F 16/174* (2019.01)
*G06F 16/11* (2019.01)
*G06F 16/182* (2019.01)
*G06F 16/14* (2019.01)

(52) U.S. Cl.
CPC ........ *G06F 16/1752* (2019.01); *G06F 16/122* (2019.01); *G06F 16/152* (2019.01); *G06F 16/1827* (2019.01)

(58) Field of Classification Search
CPC .. G06F 16/1752; G06F 16/122; G06F 16/152; G06F 16/1827; G06F 16/174; G06F 16/1748; G06F 16/215; G06F 16/24556
See application file for complete search history.

(56) References Cited

U.S. PATENT DOCUMENTS

| | | | | |
|---|---|---|---|---|
| 9,396,341 | B1* | 7/2016 | Chandra | G06F 21/602 |
| 9,420,017 | B2* | 8/2016 | Edson | G06F 16/93 |
| 9,430,490 | B1* | 8/2016 | Lewis | G06F 16/1748 |
| 9,552,843 | B2* | 1/2017 | Liebman | G11B 27/329 |
| 9,992,186 | B1* | 6/2018 | Drozd | H04L 63/102 |
| 10,282,129 | B1 | 5/2019 | Dobbels | |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Mohammed R Uddin
(74) *Attorney, Agent, or Firm* — Aaron N. Pontikos

(57) ABSTRACT

Computer implemented methods for selective data deduplication in a multitenant environment are disclosed. Data deduplication of blocks written to a storage area associated with a tenant and redundant copies of the blocks written to other storage areas of other tenants is permitted or prevented based on tagging the first storage area associated with the tenant with a particular type of parameter. Responsive to detecting a write operation directed to the storage area tagged with a parameter indicating that deduplication is not permitted, a block to be written to the storage area is modified prior to hashing the block. Responsive to detecting a write operation directed to the storage area tagged with a parameter indicating that deduplication is permitted, a block to be written to the storage area is prevented from being modified prior to hashing the block.

25 Claims, 13 Drawing Sheets

(56) References Cited

U.S. PATENT DOCUMENTS

| | | | | |
|---|---|---|---|---|
| 10,380,098 | B1* | 8/2019 | Marelas | G06F 16/2365 |
| 10,585,570 | B2* | 3/2020 | Larson | G06F 40/166 |
| 10,678,754 | B1* | 6/2020 | Colgrove | G06F 3/0608 |
| 2009/0144300 | A1* | 6/2009 | Chatley | G06F 3/067 |
| 2012/0191671 | A1* | 7/2012 | Kitamura | G06F 16/1748 |
| | | | | 707/E17.01 |
| 2013/0086006 | A1* | 4/2013 | Colgrove | G06F 16/137 |
| | | | | 707/E17.005 |
| 2013/0144845 | A1* | 6/2013 | Ghuge | G06F 16/174 |
| | | | | 707/E17.002 |
| 2013/0282980 | A1* | 10/2013 | Bennett | G06F 3/0665 |
| | | | | 711/114 |
| 2015/0012503 | A1* | 1/2015 | Akirav | G06F 16/1748 |
| | | | | 707/692 |
| 2015/0199367 | A1* | 7/2015 | Hammer | G06F 16/1748 |
| | | | | 707/654 |
| 2015/0200945 | A1* | 7/2015 | Edson | H04L 65/403 |
| | | | | 726/28 |
| 2015/0205974 | A1* | 7/2015 | Talley | G06F 21/6218 |
| | | | | 707/781 |
| 2016/0004716 | A1* | 1/2016 | Akirav | G09C 1/00 |
| | | | | 707/692 |
| 2016/0321290 | A1* | 11/2016 | Luthra | G06F 9/46 |
| 2017/0091232 | A1* | 3/2017 | Ghanbari | G06F 16/215 |
| 2017/0109348 | A1* | 4/2017 | Nagaraj | G06F 16/211 |
| 2017/0242868 | A1 | 8/2017 | Doan | |
| 2017/0264673 | A1* | 9/2017 | Yalunin | G06F 21/6218 |
| 2018/0349631 | A1* | 12/2018 | Illendula | G06F 21/6227 |
| 2019/0005261 | A1* | 1/2019 | Volvovski | G06F 21/6218 |
| 2019/0058709 | A1* | 2/2019 | Kempf | H04L 63/0876 |
| 2019/0073152 | A1* | 3/2019 | Nagle | G06F 3/067 |
| 2019/0179805 | A1 | 6/2019 | Prahlad | |
| 2019/0215155 | A1 | 7/2019 | Wang | |
| 2019/0332597 | A1 | 10/2019 | Marelas | |
| 2019/0340262 | A1* | 11/2019 | O'Hare | G06F 16/1748 |
| 2019/0340263 | A1* | 11/2019 | Porat-Stoler | G06F 16/1752 |
| 2020/0028911 | A1* | 1/2020 | Sun | G06F 3/06 |
| 2020/0183916 | A1* | 6/2020 | Shultis | G16H 10/60 |
| 2020/0293212 | A1* | 9/2020 | Narayanamurthy | G06F 3/0608 |
| 2021/0191880 | A1* | 6/2021 | Ki | G06F 12/1408 |
| 2021/0409413 | A1* | 12/2021 | Mariappan | G06K 19/06037 |
| 2022/0303383 | A1* | 9/2022 | Coffman | G06F 1/3215 |

OTHER PUBLICATIONS

Shah et al., "Selective Data Deduplication in a Multitenant Environment", U.S. Appl. No. 17/352,500, filed Jun. 21, 2021.

List of IBM Patents or Patent Applications Treated as Related, Filed Jun. 21, 2021, 2 pages.

International Search Report and Written Opinion, International Application No. PCT/IB2022/054849, International Filing Date May 24, 2022.

\* cited by examiner

| Data Block ID | List of Tenants pointing to the block | Tenant 410 price per block | Tenant 412 price per block | Tenant 414 price per block | Tenant 416 price per block |
|---|---|---|---|---|---|
| DB_A | Tenant 410, Tenant 412, Tenant 416 | X/3 | X/3 | 0 | X/3 |
| DB_B | Tenant 410, Tenant 412, Tenant 416 | X/3 | X/3 | 0 | X/3 |
| DB_C | Tenant 410, Tenant 412, Tenant 414, Tenant 416 | X/4 | X/4 | X/4 | X/4 |
| DB_D | Tenant 410, Tenant 412, Tenant 414, Tenant 416 | X/4 | X/4 | X/4 | X/4 |
| DB_$P_1$ | Tenant 410 | X | 0 | 0 | 0 |
| DB_$P_2$ | Tenant 410 | X | 0 | 0 | 0 |
| DB_$P_3$ | Tenant 410 | X | 0 | 0 | 0 |
| DB_$P_4$ | Tenant 410 | X | 0 | 0 | 0 |
| DB_$Q_1$ | Tenant 414 | 0 | 0 | X | 0 |
| DB_$Q_2$ | Tenant 414 | 0 | 0 | X | 0 |
| Total | | 5.16X (X/3+X/3+ +X/4+X/4+ X+X+X+X) | 1.16X (X/3+X/3+ X/4+X/4) | 2.5X (X/4+X/4+ X+X) | 1.16X (X/3+X/3+ X/4+X/4) |

SELECTIVE DATA DEDUPLICATION IN A MULTITENANT ENVIRONMENT

BACKGROUND

The present invention relates generally to the field of multitenant architectures, and more particularly to data deduplication across a multitenant architecture.

Multitenancy is a software architecture in which a single software instance serves multiple distinct user groups or tenants. A tenant consists of a group of users who share common access with specific privileges to a software instance. Multitenant applications typically include a level of customization for tenants, such as customizing the look and feel of the application or allowing the tenant to decide on specific access control permissions and restrictions for users. With a multitenant architecture, a software application is designed to provide every tenant with a dedicated share/partition of the instance, including its data, network, and compute resources. There are generally three main types of multitenancy architectures—a single, shared database schema, a single database with multiple schemas, and multiple databases with multiple schemas. Of these three, a single, shared database schema is used most often. With this architecture, each tenant uses a shared storage pool for storing data. Accordingly, a tenant is only required to pay for the portion of the shared storage pool utilized by the tenant.

Data deduplication is a technique for eliminating duplicate copies of repeating or redundant data. Data duplication is used to improve storage capacity utilization and can also be applied to network data transfers to reduce the number of bytes that must be sent. Given that the same byte pattern may occur dozens, hundreds, or even thousands of times (the match frequency is dependent on the chunk size), the amount of data that must be stored can be greatly reduced. Eliminating extra copies of data saves money not only directly on disk hardware costs, but also on related costs, like electricity, cooling, maintenance, and floor space.

SUMMARY

According to one embodiment of the present invention, a computer-implemented method for selective data deduplication in a multitenant environment is disclosed. The computer-implemented method includes preventing data deduplication of blocks written to a first storage area associated with a first tenant and redundant copies of the blocks written to other storage areas associated with other tenants based, at least in part, on tagging the first storage area associated with the first tenant with a first parameter. The computer-implemented further includes, responsive to detecting a write operation directed to the first storage area tagged with the first parameter, modifying a block to be written to the first storage area prior to hashing the block.

According to another embodiment of the present invention, a computer-implemented method for selective data deduplication in a multitenant environment is disclosed. The computer-implemented method includes permitting data deduplication of blocks written to a first storage area associated with a first tenant and redundant copies of the blocks written to other storage areas associated with other tenants based, at least in part, on tagging a first storage area associated with the first tenant with a first parameter. The computer-implemented method further includes, responsive to detecting a write operation directed to the first storage area tagged with the first parameter, preventing modification of a block to be written to the first storage area prior to hashing the block.

According to another embodiment of the present invention, a computer program product for selective data deduplication in a multitenant environment is disclosed. The computer program product includes one or more computer readable storage media and program instructions stored on the one or more computer readable storage media. The program instructions include instructions to prevent data deduplication of blocks written to a first storage area associated with a first tenant and redundant copies of the blocks written to other storage areas associated with other tenants based, at least in part, on tagging the first storage area associated with the first tenant with a first parameter. The program instructions further include, responsive to detecting a write operation directed to the first storage area tagged with the first parameter, instructions to modify a block to be written to the first storage area prior to hashing the block.

According to another embodiment of the present invention, a computer system for selective data deduplication in a multitenant environment is disclosed. The computer system includes one or more computer system includes one or more computer processors, one or more computer readable storage media, and program instructions stored on the computer readable storage media for execution by at least one of the one or more processors. The program instructions include instructions to prevent data deduplication of blocks written to a first storage area associated with a first tenant and redundant copies of the blocks written to other storage areas associated with other tenants based, at least in part, on tagging the first storage area associated with the first tenant with a first parameter. The program instructions further include, responsive to detecting a write operation directed to the first storage area tagged with the first parameter, instructions to modify a block to be written to the first storage area prior to hashing the block.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 is an exemplary table, generally designated 700, depicting storage costs incurred by tenants of multitenant environment 600 (as depicted in FIG. 6) in accordance with at least one embodiment of the present invention.

DETAILED DESCRIPTION

The present invention relates generally to the field of multitenant architectures, and more particularly to data deduplication across a multitenant architecture.

Data security is a major requirement of multitenancy. However, applying standard deduplication techniques in a multitenant environment may not be possible if a tenant wants a private data pool. Even if a single tenant requires a private data pool, two identical copies of data for two different tenants may need to be stored twice. Thus, although deduplication can be applied to each tenant's individual data pool, deduplication cannot be applied between a tenant's private data pool and another data pool shared by other tenants. Although this may be beneficial from a security perspective, it is not beneficial from a storage perspective since additional storage space is consumed by redundant copies of data.

In some instances, a Tenant Identifier (ID) may be concatenated with data written to each respective tenants individual storage pool or a single storage pool shared by multiple tenants. However, since each tenant has a different Tenant ID, duplicate copies of data stored between individual tenant storage pools or a single shared storage pool will not be considered as identical. Thus, although duplicate data may exist across individual tenant storage pools or within a single shared storage pool, a deduplication algorithm that concatenates a Tenant ID to data before hashing the data will fail to identify, and thereby eliminate any redundant copies of data written by different tenants.

Figure 1:
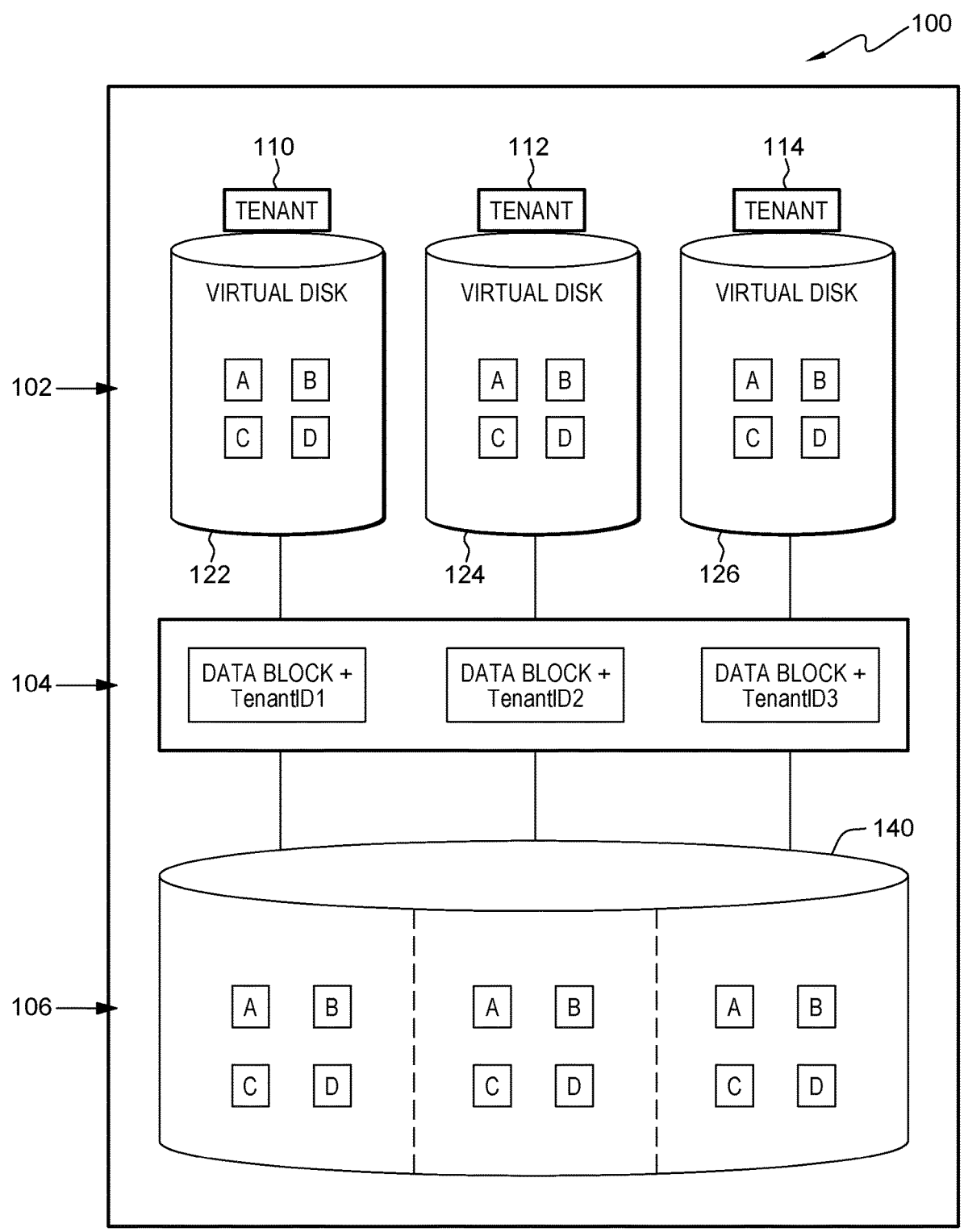
FIG. 1 is an example of a method of inline data deduplication in a multitenant environment, generally designated 100, in accordance with at least one embodiment of the present invention.

Referring now to FIG. 1, an example of a method of inline data deduplication in a multitenant environment, generally designated 100, can be seen. As depicted in FIG. 1, Tenant 110, Tenant 112, and Tenant 114 are writing the same set of data (Blocks A, B, C, and D) to Virtual Disk 122, Virtual Disk 124, and on Virtual Disk 126, respectively, of which each set of data is ultimately physically written to Storage Pool 140. This step is generally designated as 102. Although three sets of the same data (Blocks A, B, C, and D) are written to Storage Pool 140, the blocks of each set of data are concatenated with the respective Tenant ID of the tenant that issued a WRITE request prior to passing the data through a deduplication algorithm. This step is generally designated as 104. For example, Block A written by Tenant 110 may be stored as Block A_TenantID_1, Block A written by Tenant 112 may be stored as Block A_TenantID_2, and Block A written by Tenant 114 may be stored as Block A_TenantID_3. Accordingly, since the Tenant IDs for all three tenants are different, the hash values calculated for the same set of data written by each tenant will result in three different sets of hash values. Thus, to a data deduplication algorithm, there appears to exist no duplicate data between the same set of data (Blocks A, B, C, and D) written by each of Tenants 110-114. Accordingly, three individual copies of the same set of data (one copy per tenant) are written to Storage Pool 140. This step is generally designated as 106. It should be appreciated that as the number of tenants increase, the storage space utilized by redundant data written by different tenants can increase exponentially.

Similarly, embodiments of the present invention recognize that tenants in a multitenant environment may choose to encrypt their data with a unique encryption key. For example, if all of Tenants 110-114 choose to encrypt their respective data via different unique encryption keys, the hash values calculated for the same set of data written by each tenant will result in three different sets of hash values due to the use of different unique encryption keys. Thus, to a data deduplication algorithm, there appears to exist no duplicate data between the same set of data (Blocks A, B, C, and D) encrypted via each respective tenants encryption algorithm. Accordingly, three individual copies of the same set of data (encrypted via each tenants distinct encryption algorithm) would be written to Storage Pool 140 after passing the data through a deduplication algorithm. Similarly, even if only one of Tenants 110, 112, or 114 choose to encrypt their data, two copies of the same set of data (Blocks A, B, C, and D) would still exist post data deduplication.

In some instances, a multitenant architecture may even go so far as to restrict deduplication across multiple tenants. Although this may be beneficial for security purposes, the inability to identify or access duplicate data across tenants, and therefore perform data deduplication across tenants in a multitenant architecture, results in increased capacity requirements for each tenant, which ultimately results in higher storage costs for each tenant and the data center as a whole.

Embodiments of the present invention recognize that not all types of data are the same. Whereas certain data, such as highly sensitive data (e.g., personal identifiable information) should remain as separate, privately stored data, other data that is not highly sensitive should be accessible or deduplication eligible across multiple tenants for deduplication purposes. Accordingly, if at least a portion of a tenants individual storage pool is designated as shareable amongst the tenants, data deduplication can be applied across multiple individual tenant storage pools or a single shared storage pool for at least a portion of the data stored in a multitenant architecture. In doing so, only sensitive or confidential information would remain private, and thus deduplication ineligible across multiple tenants, but deduplication eligible within the tenants own storage pool. Although this may still result in the potential for some redundant copies of data to exist, those tenants that opt-in to designating at least a portion of their individual storage pool as being deduplication eligible will reduce their storage capacity requirements, and thereby ultimately reduce their storage costs while increasing the available storage of the data center as a whole.

Embodiments of the present invention improve upon the foregoing deficiencies of current multitenant architectures by providing a computer-implemented method, computer program product, and computer system that allows individual tenants in a multitenant architecture to designate at least a portion of their respective storage area as being eligible for data deduplication across multiple tenants. By allowing a tenant to designate how much of their storage area is data deduplication eligible across multiple tenants and how much of their storage area (if any) is data deduplication ineligible across multiple tenants, tenants can reduce their storage capacity requirements and overall storage costs by allowing data deduplication to be performed across multiple individual tenant storage pools or a single shared storage pool. Thus, a tenant is able to weigh their overall need for data security (i.e., what percentage, if any, of their data is sensitive or confidential) in order to reduce their overall storage costs.

According to embodiments of the present invention, tenants in a multitenant environment are provided the option to selectively enable or disable data deduplication across at least a portion of a tenants individual storage pool or at least a portion of a single, shared storage pool based on indicating whether data written to a particular volume (physical or virtual) is eligible for data deduplication across multiple tenants. In an embodiment, a tenant can tag those volumes that are not permitted to undergo data deduplication across multiple tenants with a particular parameter that indicates whether data written to the volume is confidential or not. For example, if a volume contains sensitive information, a tenant can tag the volume as "non-shareable," "private," "confidential," "restricted," or "deduplication ineligible." However, if another volume contains shareable or publicly available information, the tenant can tag this volume as "shareable," "public," "non-confidential," "unrestricted," or "deduplication eligible." For example, a tenant may tag a boot volume as "shareable," but tag a data volume containing credit card records as "non-shareable." In an embodiment, if a volume is marked with a parameter indicating that data written to the volume is ineligible for deduplication across multiple tenants, a storage controller concatenates data written to the volume with a tenant ID of the Tenant that issued the WRITE request, thereby indicating to a deduplication algorithm that deduplication is not permitted for data written to this volume across multiple tenants volume. It should be noted that deduplication is still eligible between this volume and other volumes associated with the same Tenant. In an alternative embodiment, if a volume is marked with a parameter indicating that data written to the volume is deduplication ineligible across multiple tenants, a storage controller can encrypt data written to the volume via an encryption code that is unique to a given tenant, thereby indicating to a deduplication algorithm that deduplication across multiple tenants is not permitted for data written to this volume. In an embodiment, if a volume is marked with a parameter indicating that data written to the volume is duplication eligible across multiple tenants, deduplication across multiple tenants may be achieved by the storage controller ensuring that the data written to the volume is not encrypted or concatenated (or otherwise linked) with a unique tenant ID prior to hashing the data during data deduplication.

According to further embodiments of the present invention, tenants in a multitenant environment are charged based on their storage space consumption after data deduplication. In an embodiment in which data is duplicated across multiple tenant storage pools, each tenant is charged based on a tenants data deduplication ratio (i.e., the measurement of the data's original size vs. the data's size after removing redundant data). In an embodiment in which data is deduplicated across a single, shared tenant storage pool, each tenant is charged based on a tenants data deduplication ratio (i.e., the measurement of the data's original size vs. the data's size after removing redundant data). In an embodiment, the amount a tenant is charged is based on a fixed price per block stored divided by the number of tenants pointing to a block. For example, if the price per block stored is X and four tenants are pointing to Block A, the price charged per each tenant for storing a single copy of Block A would be X/4. Accordingly, tenants are incentivized for making their data available for data deduplication.

Thus, embodiments of the present invention provide one or more of features, characteristics, operations, advantages, and/or improvements to the aforementioned challenges of performing data deduplication across tenants in a multi-tenancy storage environment: (i) a reduction in storage space utilization, (ii) a reduction in storage costs based on a tenants deduplication ratio and/or a number of tenants pointing to the same copy of data after data deduplication is performed, (iii) a storage architecture that achieves a balance between a tenants security needs, storage space utilization needs, and budget, and (iv) a storage charging model that incentivizes tenants to make non-sensitive or public data accessible or deduplication eligible across multiple tenants for the purpose of data deduplication.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

As defined herein, concatenating a Tenant ID with a block, data block, or block of data means linking a Tenant ID having a first byte string with a block, data block, or block of data having a second byte string. For example, concatenation of an 8 byte Tenant ID and a 512 byte block will form a 520 byte data segment.

As defined herein, generating a hash value for a Tenant ID concatenated with a block, data block, or block of data means generating a hash value based on a concatenation of a first byte string corresponding to a Tenant ID and a second byte string corresponding to a block, data block, or block of data. For example, concatenation of an 8 byte Tenant ID and a 512 byte block will form a 520 byte data segment. In this example, a hash value is generated based on the 520 data segment and not based on the 512 byte block.

As defined herein, generating a hash value for a block, data block, or block of data means generating a hash value based on the bytes that form the block data block, or block of data. For example, if a block is a 512 bytes, then a hash value is generated based on the 512 byte block.

The terms first, second, etc. may be used herein to describe various elements. These elements should not be limited by these terms, as these terms are only used to distinguish one element from another unless stated otherwise or the context clearly indicates otherwise.

Figure 2:
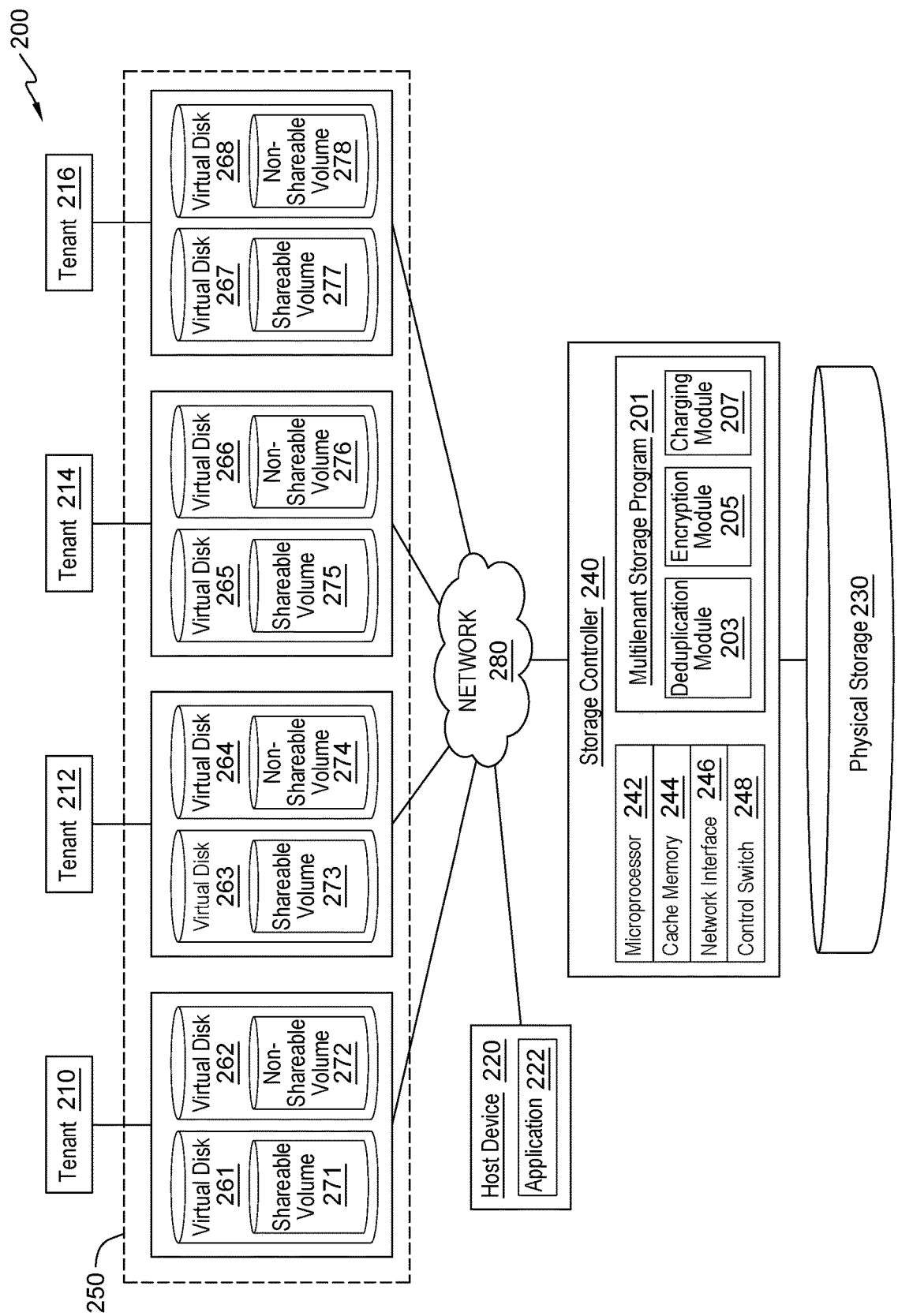
FIG. 2 is a functional block diagram of a multitenant environment, generally designated 200, for performing selective data deduplication across tenants of multitenant environment 200 in accordance with at least one embodiment of the present invention.

The present invention will now be described in detail with reference to the Figures. FIG. 2 is a functional block diagram of a multitenant environment, generally designated 200, for performing selective data deduplication across multiple tenants of multitenant environment 200 in accordance with at least one embodiment of the present invention. In an embodiment, multitenant environment 200 may be provided by cloud computing environment 50, as described with reference to FIG. 12, in accordance with at least one embodiment of the present invention.

FIG. 2 provides an illustration of only one implementation and does not imply any limitations with regard to the environments in which different embodiments may be implemented. Many modifications to the depicted environment may be made by those skilled in the art without departing from the scope of the present invention as recited by the claims.

In multitenant environments, such as multitenant environment 200, multiple tenants (i.e., groups of users) are serviced by a single instance of software running on a server. For example, a single instance of Application 222 runs on Host Device 220 and services each of Tenant 210, Tenant 212, Tenant 214, and Tenant 216. As used herein, a "Tenant" shall mean a group of users who share a common access with specific privileges to a software instance. In an embodiment, the resources being utilized by Tenants 210-216 may be shared across the tenants. For example, the same resources may be utilized by multiple different tenants, which is commonly referred to as "multi-tenant provisioning."

Multitenant Environment 200 includes Tenant 210, Tenant 212, Tenant 214, Tenant 216, Host Device 220, Physical Storage 230, Storage Controller 240, and Virtual Storage 250 interconnected over Network 280. In various embodiments of the present invention, Network 280 can be a telecommunications network, a local area network (LAN), a wide area network (WAN), such as the Internet, or a combination of the three, and can include wired, wireless, or fiber optic connections. Network 280 may include one or more wired and/or wireless networks that are capable of receiving and transmitting data, voice, and/or video signals, including multimedia signals that include voice, data, and video information. In general, Network 280 may be any combination of connections and protocols that will support communications between Tenants 210-216, Host Device 220, Physical Storage 230, Storage Controller 240, Virtual Storage 250, and other computing devices (not shown) within Multitenant Environment 200.

As used herein, the term "Tenant" may also refer to the computing devices utilized by a group of users. For example, each of Tenants 210-216 may be one or more client devices. In various embodiments, a client device is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, a client device represents any programmable electronic device or combination of programmable electronic devices capable of executing machine readable program instructions and communicating with Host Device 220, Physical Storage 230, Storage Controller 240, Virtual Storage 250, and other computing devices (not shown) within Multitenant Environment 200 via a network, such as Network 280.

Host Device 220 is configured to host resources, such as applications, that process messages (e.g., requests) provided by Tenants 210-216. In an embodiment, a single instance of an application running on Host Device 220, such as Application 222, services Tenants 210-216. In various embodiments of the present invention, Host Device 220 is a computing device that can be a standalone device, a management server, a web server, an application server, a mobile device, or any other electronic device or computing system capable of receiving, sending, and processing data. In an embodiment, Host Device 220 represents a server computing system utilizing multiple computers as a server system, such as in a cloud computing environment. In an embodiment, Host Device 220 represents a computing system utilizing clustered computers and components (e.g. database server computer, application server computer, web server computer, webmail server computer, media server computer, etc.) that act as a single pool of seamless resources when accessed within Multitenant Environment 200. In general, Host Device 220 represents any programmable electronic device or combination of programmable electronic devices capable of executing machine readable program instructions and communicating with each other, as well as with Tenants 210-216, Physical Storage 230, Storage Controller 240, Virtual Storage 250, and other computing devices (not shown) within Multitenant Environment 200 via a network, such as Network 280.

Figure 11:
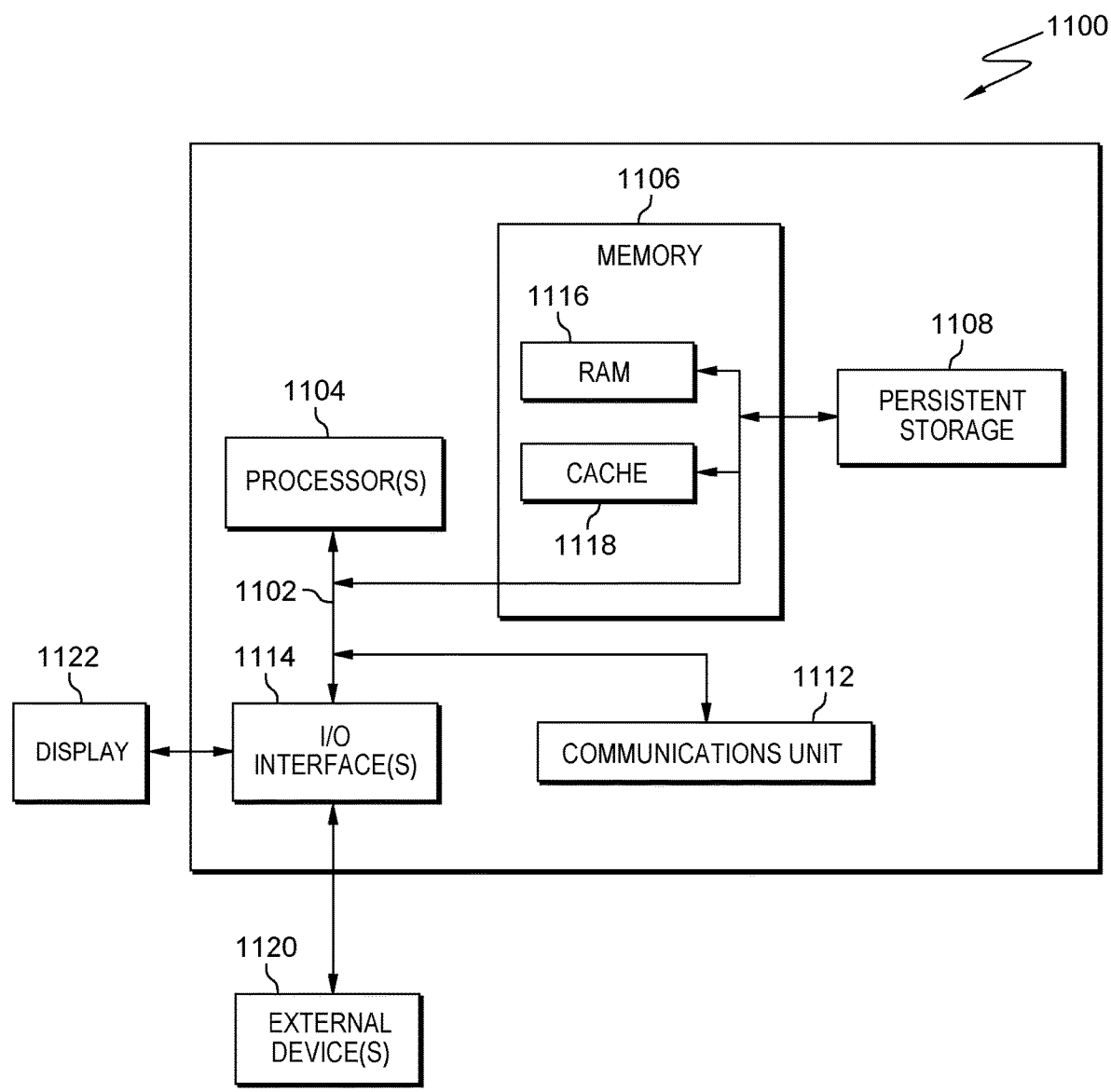
FIG. 11 is a block diagram depicting components of a computing device, generally designated 1100, suitable for executing Multitenant Storage Program 201 in accordance with at least one embodiment of the invention.
Figure 12:
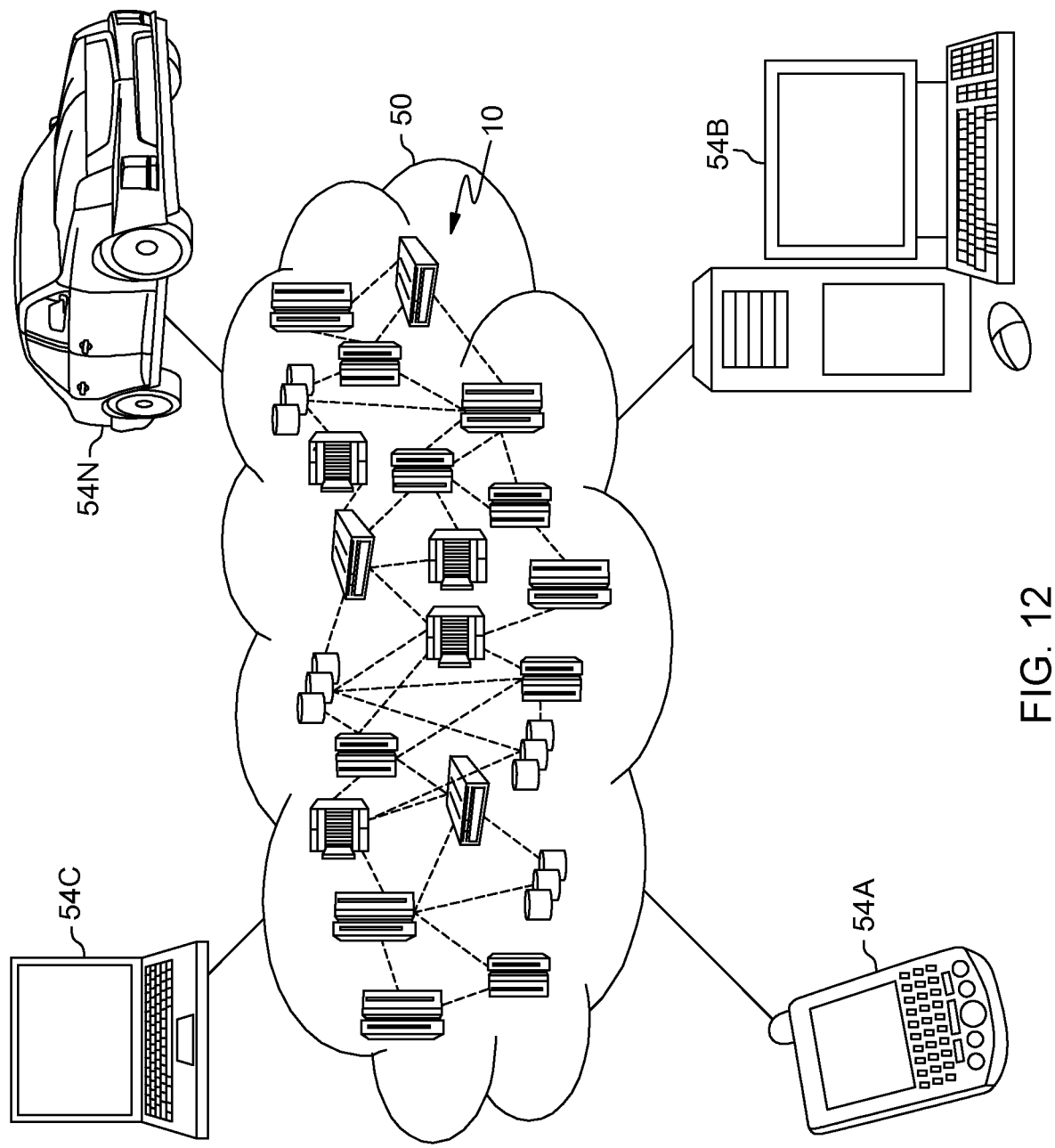
FIG. 12 is a block diagram depicting a cloud computing environment 50 in accordance with at least one embodiment of the present invention.

Host Device 220 may include components as depicted and described in further detail with respect to Cloud Computing Node 10, as described in reference to FIG. 12, in accordance with at least one embodiment of the present invention. Host Device 220 may include components as depicted and described in further detail with respect to Computing Device 1100, as described in reference to FIG. 11, in accordance with at least one embodiment of the present invention.

Physical Storage 230 is a data repository for persistently storing and managing collections of data. As depicted in FIG. 2, Physical Storage 230 is a single, shared storage pool. One of ordinary skill in the art will appreciate that a storage pool is a collection of physical storage media, such as physical disks. In an alternative embodiment, Physical Storage 230 includes a plurality of individual storage pools, in which one or more individual storage pools are associated with each of Tenants 210-216. In an alternative embodiment, Physical Storage 230 includes a combination of one or more individual storage pools and one or more shared storage pools. For example, Tenant 210 may write data to an individual storage pool and Tenants 212-216 may write data to a single, shared storage pool. However, it should be appreciated that in other embodiments, Physical Storage 230 may include any number and combination of individual and/or shared storage pools.

Virtual Storage 250 includes Virtual Disk 261 and Virtual Disk 262 (associated with Tenant 210), Virtual Disk 263 and Virtual Disk 264 (associated with Tenant 212), Virtual Disk 265 and Virtual Disk 266 (associated with Tenant 214), and Virtual Disk 267 and Virtual Disk 268 (associated with Tenant 216). Virtual Disk 261 and Virtual Disk 262 further include Shareable Volume 271 and Non-Shareable Volume 272, Virtual Disk 263 and Virtual Disk 264 further include Shareable Volume 273 and Non-Shareable Volume 274, Virtual Disk 265 and Virtual Disk 266 further include Shareable Volume 275 and Non-Shareable Volume 276, and Virtual Disk 267 and Virtual Disk 268 further include Shareable Volume 277 and Non-Shareable Volume 278. Although each virtual disk in Multitenant Environment 200 is depicted as having a single volume created thereon, in alternative embodiments, two or more volumes may be created on a single virtual disk. Similarly, in alternative embodiments, a single volume may be created from a combination of two or more virtual disks.

Physical Storage 230 is connected to Storage Controller 240 by a storage network (not depicted). In an embodiment, Physical Storage 230 is connected to Network Controller 240 via a Network Attached Storage (NAS). In an embodiment, Physical Storage 230 is connected to Network Controller 240 via a Storage Area Network (SAN).

Storage Controller 240 is a single processing unit that manages Physical Storage 230 and facilitates the processing of read and write requests intended for Physical Storage 230. It should be noted that in other embodiments, Storage Controller 240 may be formed from multiple processing units. Storage Controller 240 includes a Microprocessor 242 (for controlling Storage Controller 240), Cache Memory 244 (for temporarily storing or buffering data written to and read from Physical Storage 230), Network Interface 246 (for interfacing with external devices), and Control Switch 248 (for controlling the network channel protocol (e.g., fiber channel protocol) between a plurality of host devices, such as Host Device 220).

Storage Controller 240 may include components as depicted and described in further detail with respect to Cloud Computing Node 10, as described in reference to FIG. 11, in accordance with at least one embodiment of the present invention. Storage Controller 240 may include components as depicted and described in further detail with respect to Computing Device 1100, as described in reference to FIG. 11, in accordance with at least one embodiment of the present invention.

Storage Controller 240 further includes Multitenant Storage Program 201, which further includes Deduplication Module 203, Encryption Module 205, and Charging Module 207. In an embodiment, Multitenant Storage Program 201 may be provided by Cloud Computing Environment 50 (depicted in FIG. 11). As depicted in FIG. 2, Multitenant Storage Program 201 operates on a network storage controller, such as Storage Controller 240, and can be utilized by Storage Controller 240 via an application download from a central server or a third-party application store. In an alternative embodiment, Multitenant Storage Program 201 operates on a server, such as Host Device 220, and can be utilized by Host Device 220 via an application download from a central server or a third-party application store. In an embodiment, Multitenant Storage Program 201 may be utilized as a software service provided by a third-party cloud service provider (not shown). In an embodiment, Multitenant Storage Program 201 may include one or more components, such as add-ons, plug-ins, and agent programs, etc. (not shown), installed on one or more Tenants 210-216, Host Device 220, and/or Storage Controller 240.

Deduplication Module 203 performs data deduplication across data written to Physical Storage 230 of Multitenant Environment 200. In an embodiment, data written to Physical Storage 230 is separated into different volumes based on whether the data is shareable (i.e., deduplication eligible) or non-shareable (i.e., deduplication ineligible) across multiple tenants. In an embodiment, in order to separate the data into shareable and non-shareable volumes, a volume is tagged by a tenant as either being shareable or non-shareable. In an embodiment, once the tenant tags a volume, the particular tag associated with the volume is conveyed to Storage Controller 240, which then tags the volume at the time the volume is created. In an alternative embodiment, Deduplication Module 203 tags the volume at the time the volume is created.

In an embodiment, the tag is a flag named dedupecategory and a value of this flag can be "confidential" "non-shareable," or "deduplication ineligible." If the value of the flag dedupecategory is "confidential," "non-shareable," or "deduplication ineligible," it indicates that the data cannot be duplicated across any tenants sharing a common storage controller, such as Storage Controller 240. In an embodiment, in response to determining that the value of a flag is "confidential," "non-shareable," or "deduplication ineligible," Deduplication Module 203 concatenates a Tenant ID to the data written to the volume prior to hashing the data. In an alternative embodiment, in response to determining that the value of a flag is "confidential," "non-shareable," or "deduplication ineligible," Encryption Module 205 encrypts a data block via an encryption algorithm associated with a volume to which the data is written to prior to hashing the data. This ensures that non-shareable copies of data across one or more tenants sharing a common storage controller are stored in Physical Storage 230 post data deduplication.

In an embodiment, if the value of the flag dedupecategory is "non-confidential," "shareable," or "deduplication eligible," it indicates that the data can be deduplicated across any tenants sharing a common storage controller, such as Storage Controller 240. Accordingly, Deduplication Module 203 performs hashing based solely on the block data itself. In other words, Deduplication Module 203 does not concatenate a Tenant ID with a data block or encrypt a data block prior to hashing the data. This ensures that duplicate copies of data across multiple tenants can be identified and removed from storage.

In various embodiments, each time a WRITE request is issued to a volume, Deduplication Module 203 identifies the value of the flag associated with the volume prior to performing hashing on the data. In some embodiments, in-line deduplication is performed, in which deduplication is run as an inline process as the data is being written to Physical Storage 230. In an alternative embodiment, post-processing deduplication is performed, in which data deduplication is performed as a background process after the data is written to Physical Storage 230. For example, deduplication can be performed as a batch process at predetermined time intervals or when a number of blocks written to Physical Storage 230 reaches and/or exceeds a predetermined threshold.

Deduplication Module 203 alters data written to volumes tagged "non-shareable" or "deduplication ineligible." In an embodiment, Deduplication Module 203 concatenates a Tenant ID with data blocks written to non-shareable or deduplication ineligible volumes of Physical Storage 230. For example, Deduplication Module 203 identifies a Tenant ID associated with a tenant that sent a WRITE request and concatenates the Tenant ID with the data written to a volume in accordance with the WRITE request. In an alternative embodiment, Encryption Module 205 encrypts data blocks written to volumes tagged "non-shareable" or "deduplication ineligible." For example, Encryption Module 205 identifies a Tenant ID associated with a tenant that sent a WRITE request to a volume and encrypts the data written to the volume via a particular encryption algorithm associated with the volume or Tenant ID.

Charging Module 207 calculates storage costs for each tenant in Multitenant Environment 200. In an embodiment, tenants are charged at fixed intervals based on their particular storage consumption (e.g., gigabytes or terabytes). Typically, in a cloud environment, tenants are charged for their storage consumption at the end of each month. However, in various embodiments of the present invention, storage costs may be calculated at any predetermined interval (every second, every minute, hourly, daily, weekly, or monthly, etc.) and tenants may be charged accordingly. In an embodiment, the storage cost per block stored for each tenant is calculated based on the number of tenants pointing to a data block after data deduplication is performed. In other words, the price per block stored per tenant is equal to a fixed price per block divided by the number of tenants pointing to the same block post data deduplication.

In an embodiment, a tenant of Multitenant Environment 200 is fully charged for data blocks in which the tenant is the only tenant pointing to a data block. This occurs when a data block is written to a non-shareable or deduplication ineligible volume. For example, if Tenant 212 wrote Data Block W to Non-Shareable Volume 274, then Tenant 212 will be charged the full block price for storing Data Block W in Physical Storage 230.

In an embodiment, a tenant of Multitenant Environment 200 is only partially charged for data blocks in which multiple tenants point to the same copy of the data block. This occurs when redundant copies of data blocks are shared amongst multiple tenants. For example, if Tenant 210 and Tenant 214 each wrote the same copy of Data Block Y to Shareable Volume 271 and Shareable Volume 276, after deduplication, only a single copy of Data Block Y will be stored in Physical Storage 230. Accordingly, since each tenant originally wrote a copy of Data Block Y to a shareable volume, the duplicate copy of Data Block Y is replaced with a reference that points to a single stored copy. In this scenario, the cost for storing a single copy of Data Block Y shared by Tenant 210 and Tenant 214 would be the price for the block size of Data Block Y divided by two.

In an embodiment, the amount a tenant of Multitenant Environment 200 is charged is further based on an amount of time that a given number of tenants are pointing to a block. For example, if the price per block stored is Y, tenants are charged on a daily basis, and each of Tenants 210-216 are pointing to Block B for a total of five days, the price charged per each tenant for storing a single copy of Block B would be Y/4*5 days. However, if after five days Tenant 216 updates Block B by writing Block B' to Physical Storage, then Tenant 216 would be the only tenant pointing to the updated version (Block B') and the other three tenants, Tenants 210-214, would point to the previous version (Block B). Thus, going forward, the tenant pointing to Block B' would be charged Y for storing Block B' and the other three tenants pointing to Block B would each be charged Y/3 per day for storing Block B. In yet another example, if the price per block stored is Z, tenants are charged on a daily basis, and each of Tenants 210-216 are pointing to Block C for ten days, the price charged per each tenant for storing a single copy of Block C would be Z/4*10 days. However, if after ten days a fifth tenant points to Block C, then going forward, the price charged per each of the five tenants for storing a single copy of Block C would be Z/5 per day.

Figure 3:
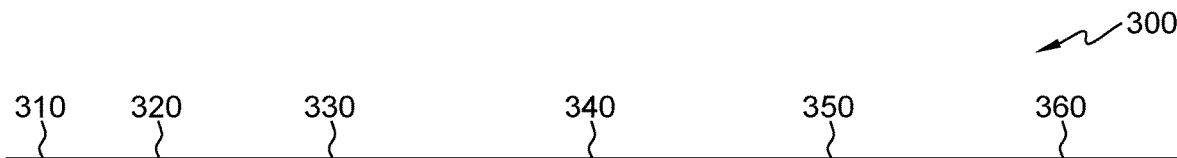
FIG. 3 is an exemplary table, generally designated 300, depicting storage costs incurred by multiple tenants in a multitenant environment in accordance with at least one embodiment of the present invention.

FIG. 3 is an exemplary Table, generally designated 300, depicting storage costs incurred by multiple tenants in a multitenant environment in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the present invention as recited by the claims.

More specifically, Table 300 depicts a charging algorithm for calculating a price per block of data written per tenant, in which the price per block per tenant is equal to the price per block divided by the number of tenants pointing to the block after deduplication is performed. It can be assumed, for example purposes only, that the price per block is X.

As depicted by Table 300, four tenants—Tenant 1, Tenant 2, Tenant 3, and Tenant 4 have written various blocks of data (DB1-DB10) (represented by the column "Data Block ID" 310) to their respective storage volumes. It can also be assumed, for example purposes only, that all of the tenants have tagged their respective volumes as shareable, and thus eligible for deduplication across multiple tenants. As demonstrated by the column "List of Tenants Pointing to the Block" 320, some tenants have written the same data blocks to their respective volumes. For simplicity purposes, only four tenants and ten blocks of data are used in this example. However, it should be noted that in a real environment, hundreds of tenants and thousands of data blocks may exist. As further depicted by Table 300, the respective storage costs incurred by Tenants 1-4 for storing or not storing each block (DB1-DB10) is represented by columns 330-360, respectively.

Beginning with DB1, since Tenant 1 is the only Tenant pointing to DB1 after deduplication, Tenant 1 is charged X for DB1. In other words, since Tenant 1 was the only Tenant to store a copy of DB1, the cost for storing a copy of DB1 is incurred entirely by Tenant 1.

With regards to DB2, since Tenant 1 is not pointing to DB2 (i.e., Tenant 1 did not write a copy of DB2 to storage) after deduplication is performed, Tenant 1 does not incur any charge for storing DB2. On the other hand, since each of Tenant 2, Tenant 3, and Tenant 4 are pointing to DB2 after deduplication was performed, the cost incurred by these Tenants is X/3. In other words, three copies of DB2 written by Tenant 2, Tenant 3, and Tenant 4, respectively, have been reduced to a single copy after deduplication, and thus the cost for storing a single copy of DB2 that is shared by Tenant 2, Tenant 3, and Tenant 4 is split between these three Tenants.

With regards to DB3, since Tenant 2 and Tenant 3 are not pointing to DB3 (i.e., Tenant 2 and Tenant 3 did not write a copy of DB3 to storage) after deduplication is performed, Tenant 2 and Tenant 3 do not incur any charge for storing DB3. On the other hand, since each of Tenant 1 and Tenant 4 are pointing to DB3 after deduplication was performed, the cost incurred by these Tenants is X/2. In other words, two copies of DB3 written by Tenant 1 and Tenant 4, respectively, have been reduced to a single copy after deduplication, and thus the cost for storing a single copy of DB3 that is shared by Tenant 1 and Tenant 4 is split between these two Tenants.

With regards to DB4, since all four Tenants are pointing to DB4 after deduplication was performed, the cost incurred by Tenants 1-4 is X/4. In other words, four copies of DB4 written by Tenants 1-4, respectively, have been reduced to a single copy after deduplication, and thus the cost for storing a single copy of DB4 that is shared by each of Tenants 1-4 is split between all four Tenants.

With regards to DB5, since Tenant 2 and Tenant 4 are not pointing to DB5 (i.e., Tenant 2 and Tenant 4 did not write a copy of DB5 to storage) after deduplication is performed, Tenant 2 and Tenant 4 do not incur any charge for storing DB5. On the other hand, since each of Tenant 1 and Tenant 3 are pointing to DB5 after deduplication was performed, the cost incurred by Tenant 1 and Tenant 3 is X/2. In other words, two copies of DB2 written by Tenant 1 and Tenant 3, respectively, have been reduced to a single copy after deduplication, and thus the cost for storing a single copy of DB5 that is shared by Tenant 1 and Tenant 3 is split between these two Tenants.

With regards to DB6, since Tenant 1 is the only Tenant pointing to DB6 after deduplication, Tenant 1 is charged X for DB1. In other words, since Tenant 1 was the only tenant to store a copy of DB6, the cost for storing a copy of DB6 is entirely incurred by Tenant 1.

With regards to DB7, since all four Tenants are pointing to DB7 after deduplication was performed, the cost incurred by Tenants 1-4 is X/4. In other words, four copies of DB7 written by Tenants 1-4, respectively, have been reduced to a single copy after deduplication, and thus the cost for storing a single copy of DB7 that is shared by Tenants 1-4 is split between all four Tenants.

With regards to DB8, since Tenant 2 is the only Tenant pointing to DB8 after deduplication, Tenant 2 is charged X for DB8. In other words, since Tenant 2 was the only Tenant to store a copy of DB8, the cost for storing a copy of DB6 is incurred entirely by Tenant 2.

With regards to DB9, since Tenant 4 is the only Tenant pointing to DB9 after deduplication, Tenant 4 is charged X for DB9. In other words, since Tenant 4 was the only Tenant to store a copy of DB9, the cost for storing a copy of DB9 is incurred entirely by Tenant 4.

With regards to DB10, since Tenant 4 is not pointing to DB10 (i.e., Tenant 4 did not write a copy of DB10 to storage) after deduplication is performed, Tenant 4 does not incur any charge for storing DB10. On the other hand, since each of Tenant 1, Tenant 2, and Tenant 3 are pointing to DB10 after deduplication was performed, the cost incurred by these Tenants is X/3. In other words, three copies of DB10 written by Tenant 1, Tenant 2, and Tenant 3, respectively, have been reduced to a single copy after deduplication, and thus the cost for storing a single copy of DB10 is shared by Tenant 1, Tenant 2, and Tenant 3 is split between these three Tenants.

Based on the price per block storage cost incurred by Tenants 1-4 (indicated by columns 330-360, respectively), the total storage costs incurred by Tenants 1-4 (indicated by row 370) is as follows:

Tenant 1=3.83X (X+X/2+X/4+X/2+X+X/4+X/3)
Tenant 2=2.16X (X/3+X/4+X/4+X+X/3)
Tenant 3=1.6X (X/3+X/4+X/2+X/4+X/3)
Tenant 4=2.3X (X/3+X/2+X/4+X/4+X)

Thus, as demonstrated by Table 300, as the amount of data designated as shareable by a tenant increases, so too does the likelihood of incurring reduced storage costs. This can be evinced by the fact that even though Tenant 1 and Tenant 3 point to the same number of blocks of data (6), the storage cost incurred by Tenant 1 is almost two and a half times greater than that of Tenant 3.

Figure 4:
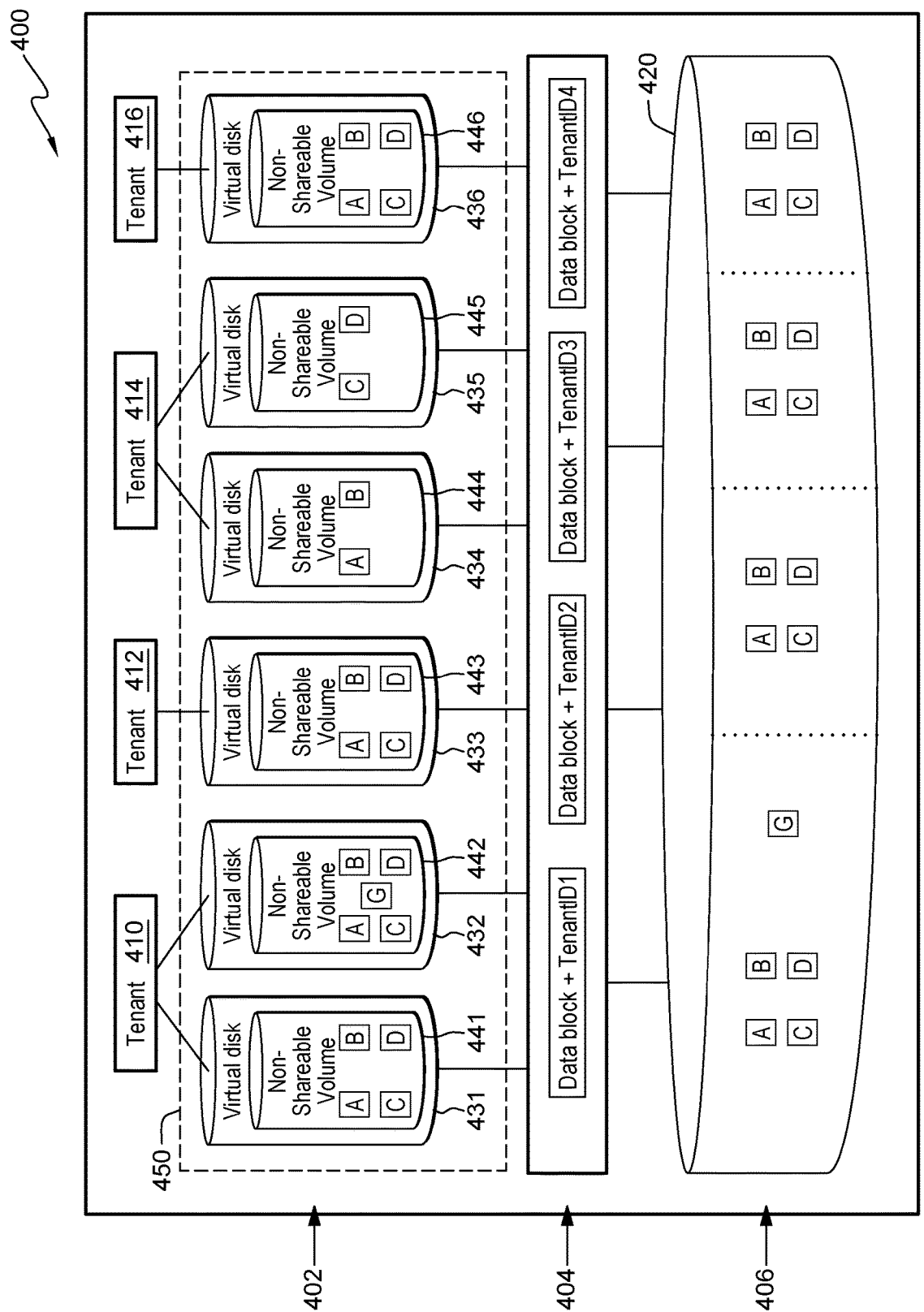
FIG. 4 is an example of inline data deduplication in a multitenant environment, generally designated 400, in which all of the respective volumes of a plurality of tenants in multitenant environment 400 are tagged deduplication ineligible across multiple tenants in accordance with at least one embodiment of the present invention.

FIG. 4 is an example of inline data deduplication in a Multitenant Environment, generally designated 400, in which all of the respective volumes of a plurality of Tenants in Multitenant Environment 400 are tagged non-shareable in accordance with at least one embodiment of the present invention. FIG. 4 provides an illustration of only one implementation and does not imply any limitations with regard to the environments in which different embodiments may be implemented. Many modifications to the depicted environment may be made by those skilled in the art without departing from the scope of the present invention as recited by the claims.

As depicted in FIG. 4, Tenants 410-416 are writing various blocks of data (signified by Blocks A, B, C, D, and G) to Non-Shareable Volumes 441-446 created on Virtual Disks 431-436, respectively, of virtual storage 450. This step is generally designated as 402. Since all of the Volumes in Multitenant Environment 400 are tagged "non-shareable," Multitenant Storage Program 201 concatenates a Tenant ID to each block and generates a hash value for each concatenated block prior to writing the blocks to Storage Pool 420. This step is generally designated as 404. Alternatively, instead of concatenating a Tenant ID to a block, Multitenant Storage Volume 201 encrypts each block via an encryption algorithm at 404.

The Tenant ID linked to a block corresponds to the particular Tenant ID associated with the tenant that issued the write operation. For example, Multitenant Storage Program 201 concatenates a Tenant ID (e.g., ID1) of Tenant 410 to Blocks A, B, C, and D written to Non-Shareable Volume 441, resulting in the following concatenated data segments: Block A_ID1, Block B_ID1, Block C_ID1, and Block D_ID1. Similarly, Multitenant Storage Program 201 concatenates ID1 of Tenant 1 410 to Blocks A, B, C, D, and G written to Non-Shareable Volume 442, resulting in the following concatenated data segments: Block A_ID1, Block B_ID1, Block C_ID1, Block D_ID1, and Block G_ID1. Multitenant Storage Program 201 concatenates a Tenant ID (e.g., ID2) of Tenant 412 to Blocks A, B, C, and D written to Non-Shareable Volume 443, resulting in the following concatenated data segments: Block A_ID2, Block B_ID2, Block C_ID2, and Block D_ID2. Multitenant Storage Program 201 concatenates a Tenant ID (e.g., ID3) of Tenant 414 to Blocks A and B written to Non-Shareable Volume 444, resulting in the following concatenated data segments: Block A_ID3 and Block B_ID3. Similarly, Multitenant Storage Program 201 concatenates ID4 of Tenant 414 to Blocks C and D written to Non-Shareable Volume 445, resulting in the following concatenated data segments: Block C_ID3 and Block D_ID4. Lastly, Multitenant Storage Program 201 concatenates a Tenant ID (e.g., ID4) of Tenant 416 to Blocks A, B, C, and D written to Non-Shareable Volume 446, resulting in the following concatenated data segments: Block A_ID4, Block B_ID4, Block C_ID4, and Block D_ID4.

Next, Multitenant Storage Program 201 generates hash values based on the concatenated data segments. For example, Multitenant Storage Program 201 generates the hash values 451, 452, 453, 454 for the concatenated data segments corresponding to Blocks A, B, C, and D written to Non-Shareable Volume 441 and the hash values 451, 452, 453, 454, and 455 for the concatenated data segments corresponding to Blocks A, B, C, and D written to Non-Shareable Volume 442. Multitenant Storage Program 201 generates the hash values 461, 462, 463, and 464 for the concatenated data segments corresponding to Blocks A, B, C, and D written to Non-Shareable Volume 443. Multitenant Storage Program 201 generates the hash values 471 and 472 for the concatenated data segments corresponding to Blocks A and B written to Non-Shareable Volume 444. Multitenant Storage Program 201 generates the hash values 481 and 482 for the concatenated data segments corresponding to Blocks A and B written to Non-Shareable Volume 445. Lastly, Multitenant Storage Program 201 generates the hash values 491, 492, 493, and 494 for the concatenated data segments corresponding to Blocks A, B, C, and D written to Non-Shareable Volume 446.

As hash values are generated for the concatenated data segments, Multitenant Storage Program 201 removes duplicate copies of repeating data (i.e., data having duplicate hash values). This step is generally designated as 406. The remaining blocks written by Tenants 410-416 after data deduplication are depicted in Storage Pool 420. With regards to Tenant 410, the same Blocks A, B, C, and D were initially written to Non-Shareable Volumes 421 and 422, respectively. Since both copies of Blocks A, B, C, and D were concatenated with the same Tenant ID (i.e., ID1), the hash values generated for each copy were also the same. Thus, after performing data deduplication, one of the copies of Blocks A, B, C, and D were removed, leaving only a single copy of Blocks A, B, C, and D written to Storage Pool 420. Similarly, since Block G was only written once to Non-Shareable Volume 442 of Tenant 410, Block G is also written to Storage Pool 420 after deduplication was performed.

Each of Tenants 412-416 wrote the same copy of Blocks A, B, C, and D to Non-Shareable Volumes 423-426, respectively. Since each tenants copy of Blocks A, B, C, and D was concatenated with a different Tenant ID, each respective copy resulted in a different set of hash values. Thus, since no duplicate hash values exist between the three copies after performing data deduplication, each of the three copies of Blocks A, B, C, and D were also written to Storage Pool 420.

It should be noted that even after data deduplication has been performed, there still remains four duplicate copies of Blocks A, B, C, and D written to Storage Pool 420. Here, each of Tenants 410-416 point to a separate copy of Blocks A, B, D, and D. This stems from the fact that since all of the volumes in Multitenant Environment 400 are designated as non-shareable, a unique Tenant ID associated with each tenant was concatenated to the blocks written to the respective volumes of the tenants. Accordingly, duplicate blocks written by different tenants resulted in blocks concatenated with different Tenant IDs, and thus, different hash values generated for the same blocks of data.

Figure 5:
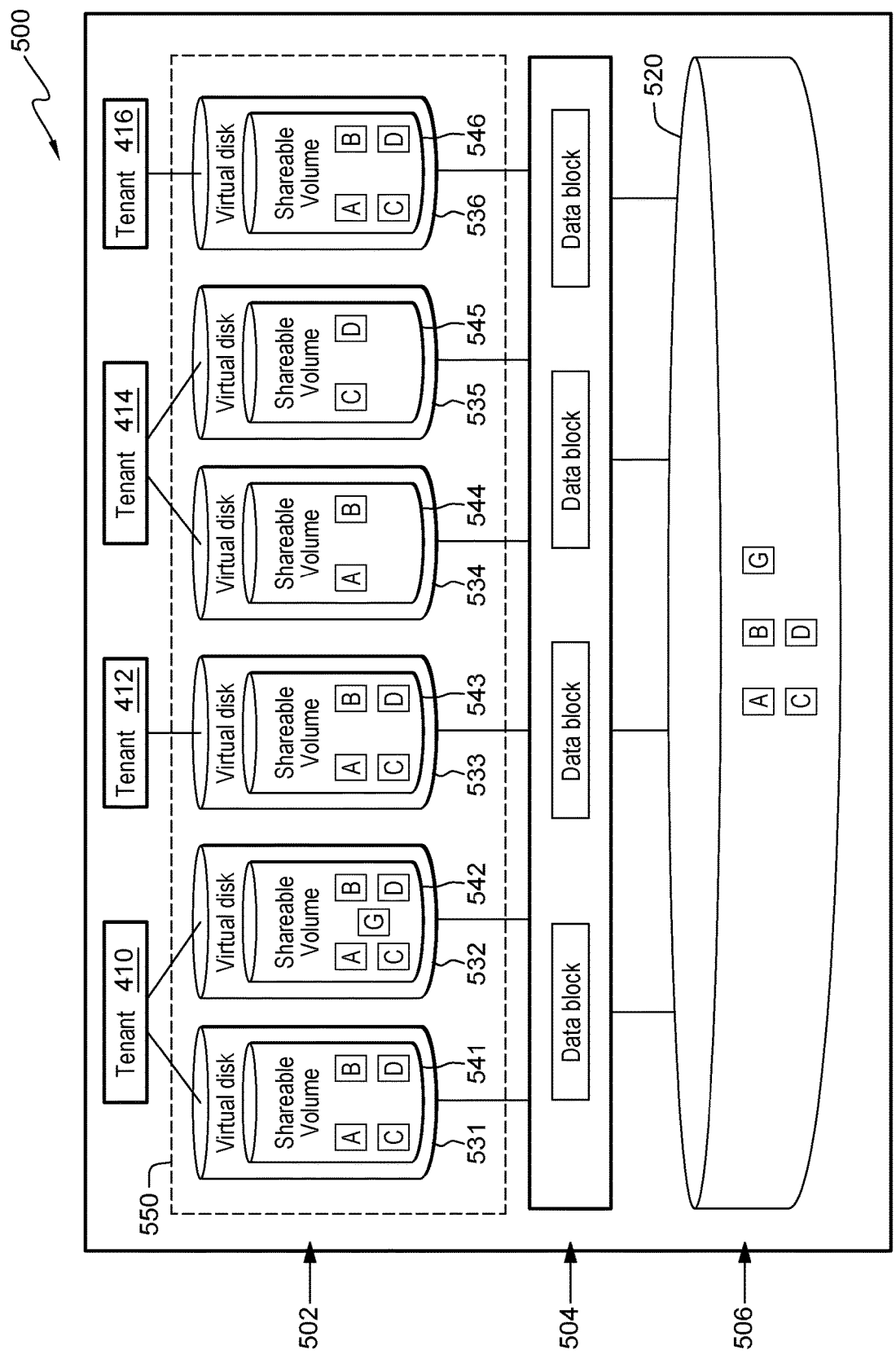
FIG. 5 is an example of inline data deduplication in a multitenant environment, generally designated 500, in which all of the respective volumes of a plurality of tenants in multitenant environment 500 are tagged deduplication eligible across multiple tenants in accordance with at least one embodiment of the present invention.

Assuming that the price per block of storage that a tenant is charged is X, the cost for storing blocks A, B, C, D, and G in Storage Pool 420 is as follows:

Tenant 410: Price for 5 Blocks (A, B, C, D, and G)=5X
Tenant 412: Price for 4 Blocks (A, B, C, and D)=4X
Tenant 414: Price for 4 Blocks (A, B, C, and D)=4X
Tenant 416: Price for 4 Blocks (A, B, C, and D)=4X FIG. 5 is an example of inline data deduplication in a multitenant environment, generally designated 500, in which all of the respective volumes of a plurality of tenants in multitenant environment 500 are tagged shareable in accordance with at least one embodiment of the present invention. FIG. 5 provides an illustration of only one implementation and does not imply any limitations with regard to the environments in which different embodiments may be implemented. Many modifications to the depicted environment may be made by those skilled in the art without departing from the scope of the present invention as recited by the claims.

As depicted in FIG. 5, Tenants 410-416 are writing various blocks of data (signified by Blocks A, B, C, D, and G) to Shareable Volumes 541-546 created on Virtual Disks 531-536, respectively, of virtual storage 550. This step is generally designated as 502. The only difference between the volumes as depicted in FIG. 4 and the volumes as depicted in FIG. 5 is that the volumes of FIG. 5 have all been tagged "shareable." Since all of the volumes in Multitenant Environment 500 are tagged "shareable," Multitenant Storage Program 201 will skip concatenating a Tenant ID to each Block. Thus, Multitenant Storage Program 201 will generate a hash value for each Block based on the block data itself. This step is generally designated as 504. Alternatively, instead of skipping concatenating a Tenant ID to blocks written to Shareable Volumes 541-546, Multitenant Storage Program 201 will skip encrypting the blocks via an encryption algorithm at 504.

For example, Multitenant Storage Program 201 generates the hash values 541, 542, 543, and 544 for Blocks A, B, C, and D written to Shareable Volume 541 of Tenant 410. Similarly, Multitenant Storage Program 201 generates the hash values 541, 542, 543, 544, and 545 for Blocks A, B, C, D, and G written to Shareable Volume 542 of Tenant 410. Multitenant Storage Program 201 generates the hash values 541, 542, 543, and 544 for Blocks A, B, C, and D written to Shareable Volume 543 of Tenant 412. Multitenant Storage Program 201 generates the hash values 541 and 542 for Blocks A and B written to Shareable Volume 544 of Tenant 414. Multitenant Storage Program 201 generates the hash values 543 and 544 for Blocks C and D written to Shareable Volume 545 of Tenant 414. Lastly, Multitenant Storage Program 201 generates the hash values 541, 542, 543, and 544 for Blocks A, B, C, and D written to Shareable Volume 546 of Tenant 416.

As hash values are generated for the blocks based on the block data itself, Multitenant Storage Program 201 removes duplicate copies of repeating data (i.e., data having duplicate hash values). This step is generally designated as 506. The remaining blocks written by Tenants 410-416 after data deduplication are depicted in Storage Pool 520. As depicted by FIG. 5, only one copy of Blocks A, B, C, and D has been written to Storage Pool 520. This stems from the fact that each of Tenants 410-416 tagged their respective volumes "shareable." Accordingly, Multitenant Storage Program 201 skipped concatenating the blocks with Tenant IDs, or in the alternative, skipped encrypting the blocks via an encryption algorithm. As such, the hash values created for the blocks were calculated based on the block data alone. In the instant case, four duplicate sets of hash values were generated corresponding to the four copies of Blocks A, B, C, and D written to volumes tagged "shareable." A single copy of Block G is also written to Storage Pool 520 since Tenant 410 was the only Tenant to write Block G to a virtual disk.

It should be noted that even though four copies of Blocks A, B, C, and D were written to respective volumes of Multitenant Environment 500, there only remains one single copy of Blocks A, B, C, and D written to Storage Pool 520. This stems from the fact that since all of the volumes were designated as shareable, a unique Tenant ID associated with a tenant was not concatenated to the blocks written to the respective volumes of the tenants. Accordingly, duplicate blocks written by different tenants resulted in the same hash values for the same blocks. Although there only remains a single copy of Blocks A, B, C, D, all tenants have access to this copy since all tenants originally wrote these blocks to shareable volumes. In doing so, all tenants will point to and thus share access to a single copy of Blocks A, B, C, and D located in Storage Pool 520. It should be noted that since Tenant 410 was the only Tenant to write Block G to a volume, Tenant 410 is the only Tenant that will point to, and thus have access to Block G written to Storage Pool 520.

Assuming that the price per block of storage that a Tenant is charged is X, the cost for storing Blocks in Storage Pool 520 is as follows:

Tenant 410: Partial price for 4 shareable Blocks (A, B, C, and D)+Full price for 1 non-shareable Block (G=(X/4+X/4+X/4+X/4)+(X)=2X Tenant 412: Partial price for 4 shareable Blocks (A, B, C, and D)=(X/4+X/4+X/4+X/4)=X Tenant 414: Partial price for 4 shareable Blocks (A, B, C, and D)=(X/4+X/4+X/4+X/4)=X Tenant 416: Partial price for 4 shareable Blocks (A, B, C, and D)=(X/4+X/4+X/4+X/4)=X As compared to the storage costs incurred by the Tenants of Multitenant Environment 500 for writing the same Blocks as the Blocks written by the Tenants of Multitenant Environment 400, the storage cost of Tenant 410 is reduced by more than fifty-percent, and the storage costs of Tenants 412-416 are reduced by seventy-five percent.

Figure 6:
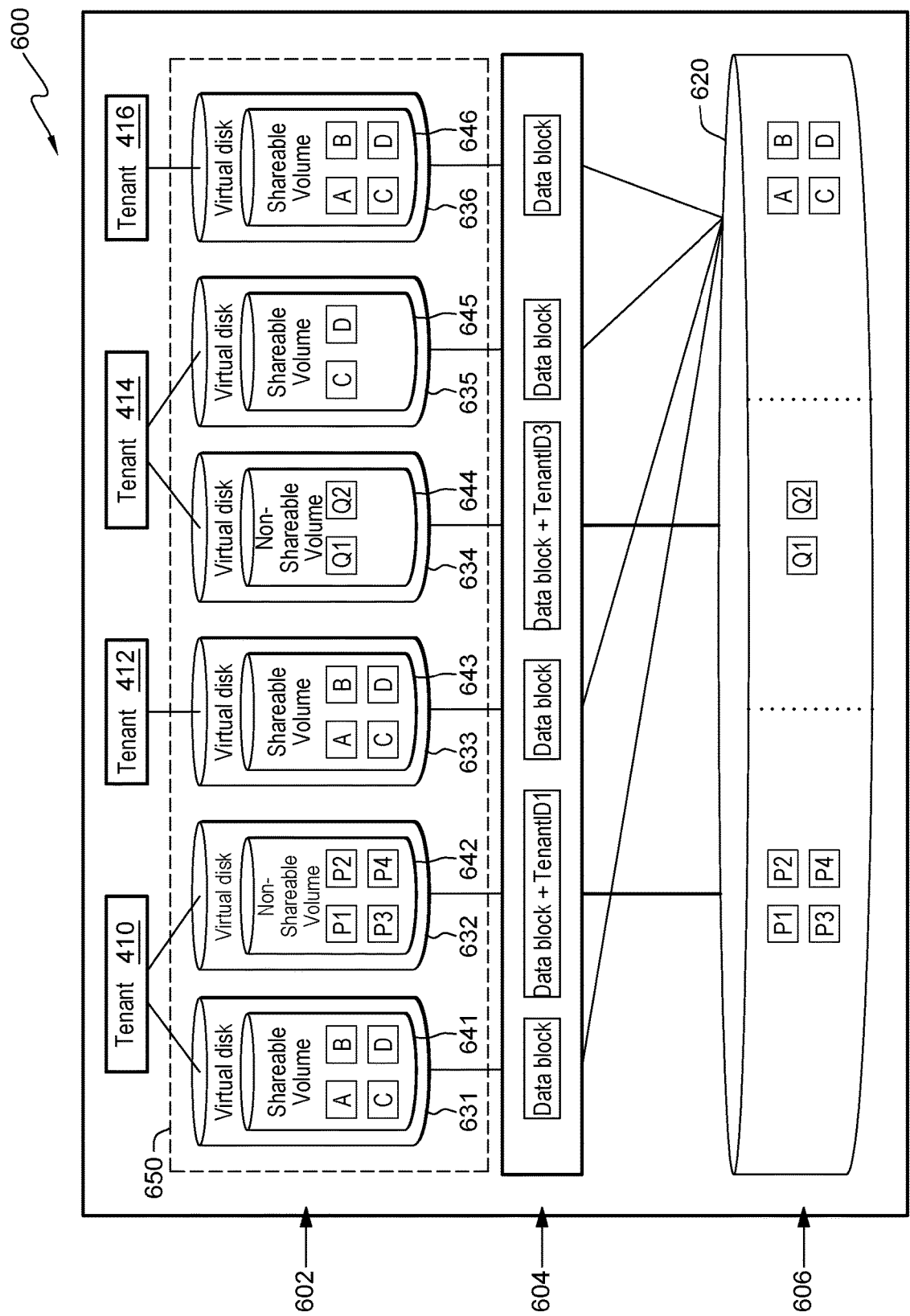
FIG. 6 is an example of inline data deduplication in a multitenant environment, generally designated 600, in which a mixture of volumes of a plurality of tenants in multitenant environment 600 are tagged as deduplication eligible and deduplication ineligible across multiple tenants in accordance with at least one embodiment of the present invention.

FIG. 6 is an example of inline data deduplication in a Multitenant Environment, generally designated 600, in which a mixture of virtual disks and/or storage volumes of a plurality of Tenants in Multitenant Environment 600 are tagged as shareable and non-shareable in accordance with at least one embodiment of the present invention. FIG. 6 provides an illustration of only one implementation and does not imply any limitations with regard to the environments in which different embodiments may be implemented. Many modifications to the depicted environment may be made by those skilled in the art without departing from the scope of the present invention as recited by the claims.

As depicted in FIG. 6, Tenants 410-416 are writing various blocks of data (signified by Blocks A, B, C, D, G, $P_1$, $P_2$, $P_3$, $P_4$, $Q_1$, and $Q_2$) to respective shareable and non-shareable volumes of virtual storage 650. This step is generally designated as 602. As further depicted by FIG. 6, Shareable Volume 641 created on Virtual Disk 631 (associated with Tenant 410), Shareable Volume 643 created on Virtual disk 633 (associated with Tenant 412), Shareable Volume 645 created on Virtual disk 635 (associated with Tenant 414), and Shareable Volume 646 created on Virtual Disk 636 (associated with Tenant 414) have all been tagged "shareable." Accordingly, those blocks written to storage volumes tagged "shareable" are eligible for deduplication across Tenants of Multitenant Environment 600. Similarly, Non-Shareable Volume 642 created on Virtual Disk 632 (associated with Tenant 410) and Non-Shareable Volume 644 created on Virtual disk 634 (associated with Tenant 414) have been tagged "non-shareable." Accordingly, those blocks written to storage volumes tagged "non-shareable" are ineligible for deduplication across tenants of Multitenant Environment 600.

As blocks are written to their respective volumes, Multitenant Storage Program 201 generates hash values for each block. This step is generally designated as 604. For those blocks written to shareable volumes, Multitenant Storage Program 201 does not concatenate a Tenant ID with a block, nor does Multitenant Storage Program 201 encrypt a block via an encryption algorithm. Rather, Multitenant Storage Program 201 generates a hash value for each block based on the block data itself. On the other hand, for those blocks written to non-shareable volumes, Multitenant Storage Program 201 either concatenates a Tenant ID with a block or encrypts a block via an encryption algorithm. Whether a block is concatenated with a Tenant ID or encrypted via an encryption algorithm may be predesignated by the tenants of Multitenant Environment 600 on a tenant by tenant basis.

For example, Multitenant Storage Program 201 generates the hash values 651, 652, 653, and 654 based on the block data itself for Blocks A, B, C, and D written to Shareable Volume 641. However, Multitenant Storage Program 201 generates the hash values 661, 662, 663, and 664 based on the concatenated data segments corresponding to Blocks $P_1$, $P_2$, $P_3$, and $P_4$, written to Shareable Non-Shareable Volume 542. Multitenant Storage Program 201 generates the hash values 651, 652, 653, and 654 for Blocks A, B, C, and D written to Shareable Volume 643 based on the block data itself. However, Multitenant Storage Program 201 generates the hash values 671 and 672 based on the concatenated data segments corresponding to Blocks $Q_1$, and $Q_2$ written to Non-Shareable Volume 644. Multitenant Storage Program 201 generates the hash values 653 and 654 based on the block data itself for Blocks C and D written to Shareable Volume 645. Lastly, Multitenant Storage Program 201 generates the hash values 651, 652, 653, and 654 based on the block data itself for Blocks A, B, C, and D written to Shareable Volume 646.

As hash values are generated for those blocks written to volumes tagged "non-shareable" (i.e., the blocks are concatenated by a Tenant ID or encrypted via an encryption algorithm), Multitenant Storage Program 201 removes duplicate copies of repeating data having the same hash value This step is generally designated as 606. Since each tenant has a different unique ID, only duplicate blocks written to non-shareable volumes associated with the same tenant can be removed by Multitenant Storage Program 201. As hash values are generated for those blocks that are written to volumes tagged "shareable," (i.e., the blocks are not concatenated by a Tenant ID or via an encryption algorithm), Multitenant Storage Program 201 removes duplicate copies of repeating data having the same hash value. Here, duplicate blocks written to shareable volumes can be removed across different tenants in Multitenant Environment 600 since hash values generated for blocks written to shareable volumes are generated based on the block data itself. Accordingly, duplicate copies of data written to any virtual volume tagged "shareable" can be identified and removed, regardless of the owner of the volume.

The remaining blocks written by Tenants 410-416 after data deduplication are depicted in Storage Pool 620. Since data deduplication cannot be performed across Multitenant Environment 600 for Blocks $P_1$, $P_2$, $P_3$, and $P_4$ written to Non-Shareable Volume 642, only Tenant 410 points to Blocks $P_1$, $P_2$, $P_3$, and $P_4$ stored in Storage Pool 620. Similarly, since data deduplication cannot be performed across Multitenant Environment 600 for Blocks $Q_1$ and $Q_2$ written to Non-Shareable Volume 644, only Tenant 414 points to Blocks $Q_1$ and $Q_2$ stored in Storage Pool 620.

On the other hand, data deduplication can be performed across Multitenant Environment 600 for duplicate blocks written to shareable volumes. For example, although three separate copies of Blocks A and B were written to Volumes 641, 643, and 646, Tenants 410, 412, and 416 all point to a single copy of Blocks A and B written to Storage Pool 620. This stems from the fact that since these three volumes were designated as shareable, a unique Tenant ID associated with a tenant was not concatenated to these blocks prior to hashing the blocks. Accordingly, duplicates of Blocks A and B written by different tenants resulted in the same hash values for these blocks. Similarly, although four separate copies of Blocks C and D were written to Volumes 641, 643, 645, and 646, respectively, Tenants 410-416 all point to a single copy of Blocks C and D written to Storage Pool 620. Again, this stems from the fact that since each copy of Blocks C and D were written to a volume designated as shareable, a unique Tenant ID associated with a tenant was not concatenated to the blocks prior to hashing the blocks. Accordingly, duplicates of Block C and D written by different tenants resulted in the same hash values for these blocks.

FIG. 7 is an exemplary Table, generally designated 700, depicting storage costs incurred by Tenants of Multitenant Environment 600 (as depicted in FIG. 6) in accordance with at least one embodiment of the present invention. FIG. 7 provides an illustration of only one implementation and does not imply any limitations with regard to the environments in which different embodiments may be implemented. Many modifications to the depicted environment may be made by those skilled in the art without departing from the scope of the present invention as recited by the claims.

More specifically, Table 700 depicts a charging algorithm for calculating a price per block of data written per tenant, in which the price per block per tenant is equal to the price per block divided by the number of tenants pointing to the block after deduplication is performed. It can be assumed, for example purposes only, that the price per block is X.

As depicted by Table 700, Tenants 410-416 have written various data blocks (DB_A, DB_B, DB_C, DB_D, DB_$P_1$, DB_$P_2$, DB_$P_3$, DB_$P_4$, DB_$Q_1$, and DB_$Q_2$) (represented by the column "Data Block ID" 710) to their respective shareable and non-shareable volumes. The column "List of Tenants Pointing to the Block" 720 indicates those tenants pointing to a particular block of data stored in Storage Pool 620 (depicted in FIG. 6) after data deduplication is performed. In order for a tenant to point to a particular block stored in Storage Pool 620, the Tenant has to have previously written a copy of a block to a volume associated with the Tenant. As further depicted by Table 700, the respective storage costs incurred by Tenants 410-416 for storing or not storing respective blocks in Storage Pool 620 is represented by columns 730-760, respectively.

Beginning with DB_A, since Tenant 414 is not pointing to DB_A (Tenant 414 did not write a Pool copy of DB_A to a volume), Tenant 414 does not incur any charge for storing DB_A in Storage 620. On the other hand, since each of Tenants 410, 412, and 416 are pointing to DB_A after data deduplication was performed, the cost incurred by these Tenants is X/3. In other words, three copies of DB_A written by Tenants 410, 412, and 416, respectively, have been reduced to a single copy after data deduplication, and thus the cost for storing a single copy of DB_A in Storage Pool 620 that is accessible to each of Tenants 410, 412, and 416 is split between these three tenants.

With regards to DB_B, since Tenant 414 is not pointing to DB_B (Tenant 414 did not write a copy of DB_B to a volume), Tenant 414 does not incur any charge for storing DB_B in Storage Pool 620. On the other hand, since each of Tenants 410, 412, and 416 wrote a copy of DB_B to a shareable volume, the cost incurred by these Tenants after data deduplication is performed is X/3. In other words, three copies of DB_B written by Tenants 410, 412, and 416, respectively, have been reduced to a single copy after deduplication, and thus the cost for storing a single copy of DB_B in Storage Pool 620 that is accessible to each of Tenants 410, 412, and 416 is split between these three tenants.

With regards to DB_C, since all four Tenants 410-416 are pointing to DB_C after data deduplication was performed (i.e., all four Tenants wrote a copy of DB_C to a shareable volume), the cost incurred by Tenants 410-416 is X/4. In other words, four copies of DB_C written by Tenants 410-416, respectively, have been reduced to a single copy after data deduplication, and thus the cost for storing a single copy of DB_C in Storage Pool 620 that is accessible to each of Tenants 410-416 is split between all four Tenants.

With regards to DB_D, since all four Tenants 410-416 are pointing to DB_D after data deduplication was performed (all four Tenants wrote a copy of DB_D to a shareable volume), the cost incurred by Tenants 410-416 is X/4. In other words, four copies of DB_D written by Tenants 410-416, respectively, have been reduced to a single copy after data deduplication, and thus the cost for storing a single copy of DB_D in Storage Pool 620 that is accessible to each of Tenants 410-416 is split between all four Tenants.

With regards to $DB\_P_1$, $DB\_P_2$, $DB\_P_3$, and $DB\_P_4$, since Tenant 410 is the only Tenant pointing to these data blocks after data deduplication (Tenant 410 wrote Blocks $P_1$, $P_2$, $P_3$, and $P_4$ to a non-shareable volume), Tenant 410 is charged X for storing $DB\_P_1$, X for storing $DB\_P_2$, X for storing $DBP_3$, and X for storing $DB\_P_4$ in Storage Pool 620. In other words, since Tenant 410 wrote a copy of $DB\_P_1$, $DB\_P_2$, $DB\_P_3$, and $DB\_P_4$ and to a non-shareable volume, the cost for storing a copy of these blocks in Storage Pool 620 is entirely incurred by Tenant 410.

With regards to $DB\_Q_1$ and $DB\_Q_2$, since Tenant 414 is the only tenant pointing to Block $Q_1$ and $Q_2$ after data deduplication (Tenant 414 wrote Blocks $Q_1$ and $Q_2$ to a non-shareable volume), Tenant 414 is charged X for storing $DB\_Q_1$ and X for storing $DB\_Q_2$ in Storage Pool 620. In other words, since Tenant 414 wrote $DB\_Q_1$ and $Q_2$ to a non-shareable volume, the cost for storing a copy of $DB\_Q_1$ and $DB\_Q_2$ in Storage Pool 620 is entirely incurred by Tenant 414.

Figure 8:
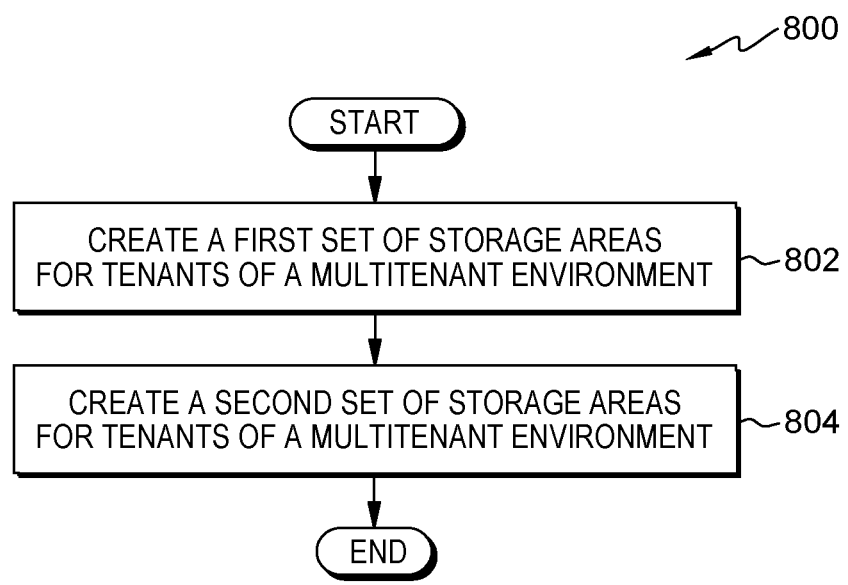
FIG. 8 is a flowchart diagram, generally designated 800, depicting operational steps for designating tenant data as being deduplication eligible or deduplication ineligible across multiple tenants in a multitenant environment in accordance with at least one embodiment of the present invention.

Based on the price per block storage costs incurred by Tenants 410-416 (indicated by columns 730-760, respectively), the total storage costs incurred by Tenants 410-416 (indicated by row 770) is as follows:

Tenant 410: Partial price for four shareable Data Blocks (DB_A, DB_B, DB_C, and DB_D)+Full price for four non-shareable Data Blocks ($DB\_P_1$, $P_2$, $P_3$, and $P_4$)= (X/3+X/3+X/4+X/4)+(X+X+X+X)=5.16X Tenant 412: Partial price for four shareable Blocks (DB_A, DB_B, DB_C, and DB_D)=(X/3+X/3+X/4+X/4)=1.16X Tenant 414: Partial price for two shareable Blocks (DB_C, and DB_D)+Full price for two non-shareable Data Blocks ($DB\_Q_1$ and $DB\_Q_2$)=(X/4+X/4)+(X+X)= 2.5X Tenant 416: Partial price for four shareable Blocks (DB_A, DB_B, DB_C, and DB_D)=(X/3+X/3+X/4+X/4)=1.16X FIG. 8 is a flowchart diagram, generally designated 800, depicting operational steps for designating tenant data as being deduplication eligible or deduplication ineligible across multiple tenants in Multitenant Environment 200 (depicted in FIG. 2). FIG. 8 provides an illustration of only one implementation and does not imply any limitations with regard to the environments in which different embodiments may be implemented. Many modifications to the depicted environment may be made by those skilled in the art without departing from the scope of the present invention as recited by the claims. It should be noted that although the steps of FIG. 8 utilize a storage area network volume controller, the invention can be practiced utilizing any type of known or future known storage controller and any type of known or future known storage networks and storage technologies.

At step 802, Multitenant Storage Program 201 creates a first set of storage areas associated with respective tenants of a multitenant environment, such as multitenant environment 200 (depicted in FIG. 2). In an embodiment, the first set of storage areas only include data designated as being deduplication eligible across multiple tenants in a multitenant environment. In an embodiment, creating the first set of storage areas includes creating a first set of physical storage areas. In an embodiment, creating the first set of physical storage areas further includes creating a first set of virtual storage areas from the first set of physical storage areas. In an embodiment, creating the first set of virtual storage areas further includes creating a first set of virtual disks. In an embodiment, creating the first set of virtual disks further includes creating a first set of volumes on the first set of virtual disks. In an embodiment, creating the first set of volumes further includes mounting the first set of volumes on the first set of virtual disks. In an embodiment, creating the first set of volumes further includes creating file systems for the first set of volumes.

In an embodiment, creating the first set of storage areas further includes tagging each volume in the first set of volumes created on the first set of virtual disks as "shareable," "non-confidential," or "deduplication eligible." For example, Multitenant Storage Program 201 tags a volume created on a virtual disk with a flag named dedupecategory with a value of "non-confidential data," "shareable data," or "deduplication eligible data." As a further example, if storage Controller 240 (depicted in FIG. 2) is an IBM SAN Volume Controller (SVC), Multitenant Storage Program 201 may issue the following command to Storage Controller 240 to tag the volume as being deduplication eligible: mkvdisk—mdiskgrp datareductionpool0—size 100—unit gb—iogrp 0—rsize 0—autoexpand—deduplicated—dedupecategory—shareable.

At step 804, Multitenant Storage Program 201 creates a second set of storage areas for respective Tenants of a multitenant environment, such as multitenant environment 200 (depicted in FIG. 2). In an embodiment, the second set of storage areas only include data designated as being deduplication ineligible across multiple tenants in a multitenant environment. In an embodiment, creating the second set of storage areas further includes creating a second set of physical storage areas. In an embodiment, creating the second set of storage areas further includes creating a second set of virtual storage areas from the second set of storage areas. In an embodiment, creating the second set of virtual storage areas further includes creating a second set virtual disks. In an embodiment, creating the second set of virtual storage areas further includes creating a second set of volumes on the second set of virtual disks. In an embodiment, creating the second set of volumes further includes mounting the second set of volumes on the second set of virtual disks. In an embodiment, creating the second set of volumes further includes creating file systems for the second set of volumes.

In an embodiment, creating the second set of storage areas further includes tagging each volume in the first set of volumes corresponding to the second set of virtual disks as "non-shareable," "non-confidential," or "deduplication ineligible." For example, program 201 tags a volume with a flag named dedupecategory with a value of "confidential data," "non-shareable data," or "deduplication ineligible data." As a further example, if Storage Controller 240 (depicted in FIG. 2) is an IBM SAN Volume Controller (SVC), Multitenant Storage Program 201 may issue the following command to Storage Controller 240 to tag a volume as being deduplication ineligible: mkvdisk—mdiskgrp datareductionpool0—size 100—unit gb—iogrp 0—rsize 0—autoexpand—deduplicated—dedupecategory—non-shareable.

It should be noted that although data deduplication across multiple tenants is not possible for data written to a volume tagged as dedupecategory—non-shareable, deduplication of duplicate data written to the same volume tagged dedupecategory—non-shareable is still permissible. Similarly, although a tenant may tag multiple volumes as dedupecategory—non-shareable, deduplication of duplicate data across volumes tagged dedupecategory—non-shareable associated with the same tenant may also be possible.

Figure 9:
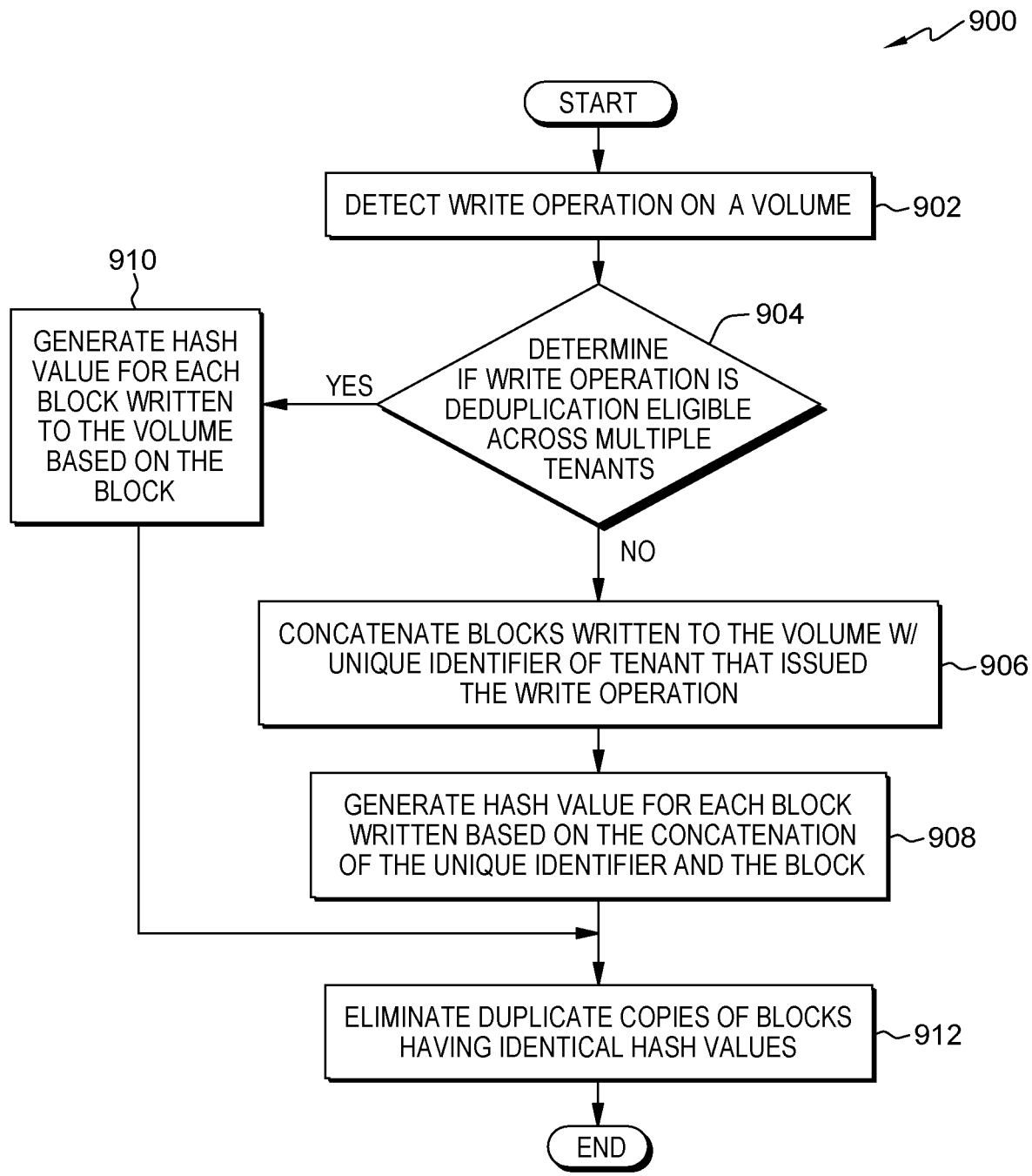
FIG. 9 is a flowchart diagram, generally designated 900, depicting operational steps for performing selective data deduplication in a multitenant environment in accordance with at least one embodiment of the present invention.

FIG. 9 is a flowchart diagram, generally designated 900, depicting operational steps for performing selective data deduplication in a multitenant environment, such as Multitenant Environment 200 (depicted in FIG. 2), in accordance with at least one embodiment of the present invention. FIG. 9 provides an illustration of only one implementation and does not imply any limitations with regard to the environments in which different embodiments may be implemented. Many modifications to the depicted environment may be made by those skilled in the art without departing from the scope of the present invention as recited by the claims.

At step 902, Multitenant Storage Program 201 identifies and/or receives a write operation/request from a Tenant. In an embodiment, the write operation/request is directed to a physical volume associated with a physical storage area. For example, the write operation/request is directed to a physical volume associated with a storage pool. In an embodiment, the write operation/request is directed to a volume created on a virtual disk. In an embodiment, the write operation/request is directed to a virtual volume or logical volume created on a virtual disk.

At decision step 904, Multitenant Storage Program 201 determines whether the write operation/request is deduplication eligible across multiple tenants. In an embodiment, a write operation/request is deduplication eligible across multiple tenants if the write operation/request is directed to a volume having a tag with a value indicative that the volume is eligible for duplication across multiple tenants. For example, a volume having a tag with a value of "shareable," "non-confidential," or "deduplication eligible" may be used to indicate to Multitenant Storage Program 201 that data written to the volume is deduplication eligible across multiple tenants. As a further example, if Multitenant Storage Program 201 identifies or otherwise receives a write operation/request from Tenant A to write Data Block 123 to Volume 5, Multitenant Storage Program 201 determines that Volume 5 is tagged "shareable" and is therefore deduplication eligible.

In an embodiment, a write operation/request is deduplication ineligible for deduplication across multiple tenants if the write operation/request is directed to a volume having a tag with a value indicative that the volume is deduplication ineligible across multiple tenants. For example, a volume having a tag with a value of "non-shareable," "confidential," or "deduplication ineligible" may be used to indicate to Multitenant Storage Program 201 that data written to the volume is ineligible for deduplication across multiple tenants. As a further example, if Multitenant Storage Program 201 identifies or otherwise receives a write operation/request from Tenant B to write Data Block 456 to Volume 7, Multitenant Storage Program 201 determines that Volume 7 is tagged "non-shareable" and is therefore deduplication ineligible across multiple tenants. In an embodiment, tags associated with respective volumes are stored in a look-up table or index.

In response to determining that a write operation/request directed to a volume is eligible for data duplication across multiple tenants (decision step 904 "YES" branch), Multitenant Storage Program 201 proceeds to step 910. In response to determining that a write operation/request directed to a volume is not eligible for data deduplication across multiple tenants (decision step 904 "NO" branch), Multitenant Storage Program 201 proceeds to decision step 906.

At step 906, in response to determining that a write operation/request directed to a volume is ineligible for data deduplication across multiple tenants, Multitenant Storage Program 201 concatenates data blocks written to the volume with a unique identifier of the Tenant that issued the write operation prior to applying a hashing algorithm to the data blocks. As used herein, the concatenation of a data block with a unique identifier of a Tenant shall be referred to as a concatenated data segment. For example, if Tenant 1 issues a write operation to write Data Block A to deduplication ineligible Volume 9, then a concatenated data segment is formed by concatenating a data segment corresponding to Block A with a Tenant ID of Tenant 1. In an alternative embodiment, at step 906, in response to determining that a write operation directed to a volume is deduplication ineligible across multiple tenants, Multitenant Storage Program 201 encrypts data blocks written to a deduplication ineligible volume via an encryption algorithm prior to applying a hashing algorithm to the data blocks.

At step 908, Multitenant Storage Program 201 generates hash values for data blocks written to a deduplication ineligible volume based on the concatenated data segment(s). Continuing with the previous example, if the data segment corresponding to Data Block A is 123 and the Tenant ID of Tenant 1 is xyz, then Multitenant Storage Program 201 generates a hash value for Data Block A based on the concatenated data segment "xyz123" or "123xyz." In an alternative embodiment, Multitenant Storage Program 201 generates hash values for data blocks written to a deduplication ineligible volume after a block has been encrypted via an encryption algorithm. For example, if Data Block B is written to deduplication ineligible volume 5, then Multitenant Storage Program 201 converts the data segment corresponding to Data Block B into ciphertext via an encryption algorithm and generates a hash value for Data Block B based on the cyphertext.

At step 910, Multitenant Storage Program 201 generates hash values for data blocks written to volumes eligible for deduplication across multiple volumes based on the data block itself. In other words, hash values are generated based on the data corresponding to a Data Block. For example, if a data segment corresponding to Data Block C is 456, then Multitenant Storage Program 201 generates a hash value for Data Block A based on the data segment 456.

At step 912, Multitenant Storage Program 201 eliminates duplicate copies of data blocks based on identifying data blocks having identical hash values. In an embodiment, eliminating a duplicate copy of a data block includes replacing the duplicate copy with a reference that points to a stored copy. In an embodiment, duplicate copies are eliminated prior to writing a data block to a physical storage area associated with a Tenant. In an alternative embodiment, duplicate copies are eliminated after writing a data block to a physical storage area associated with a Tenant.

Figure 10:
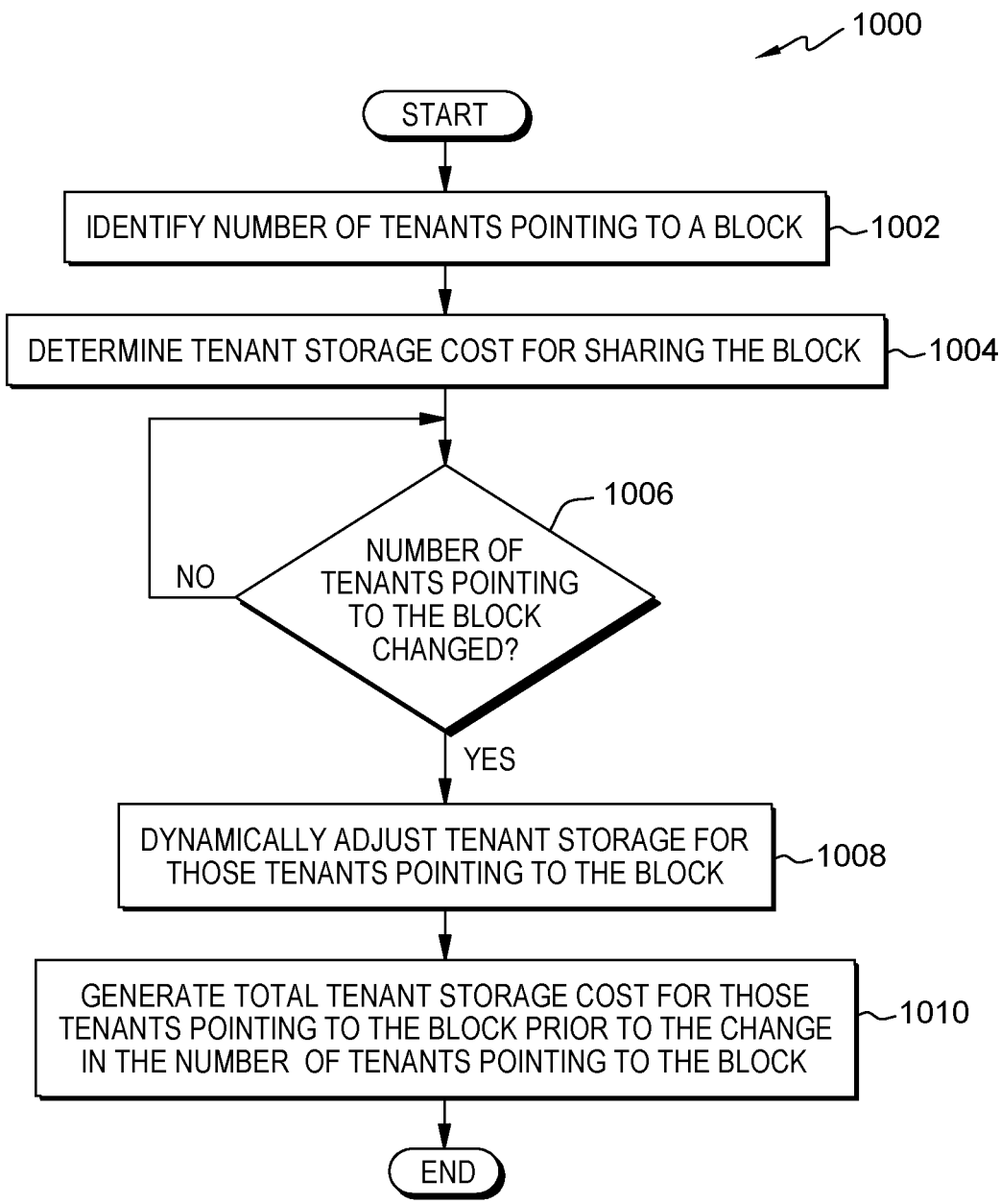
FIG. 10 is a flowchart diagram, generally designated 1000, depicting operational steps for dynamically calculating storage costs for respective tenants of a multitenant environment in accordance with at least one embodiment of the present invention.

FIG. 10 is a flowchart diagram, generally designated 1000, depicting operational steps for dynamically calculating storage costs for respective tenants of a multitenant environment, such as Multitenant Environment 200 (depicted in FIG. 2), in accordance with at least one embodiment of the present invention. It should be appreciated that although FIG. 10 makes reference to block storage, and in particular, blocks of data, the steps of FIG. 10 may be practiced utilizing any type of known or future known storage architectures, including file storage, block storage, and object storage, and any type of known or future known data structures, includes blocks, files, and objects. FIG. 10 provides an illustration of only one implementation and does not imply any limitations with regard to the environments in which different embodiments may be implemented. Many modifications to the depicted environment may be made by those skilled in the art without departing from the scope of the present invention as recited by the claims.

At step 1002, Multitenant Program 201 identifies a number of Tenants pointing to a copy of a block. In an embodiment, only a single Tenant points to a copy of a block if the Tenant wrote the copy of the block to a volume designated deduplication ineligible across multiple volumes. For example, if Tenant 214 writes Block L to Non-Shareable Volume 276 on Virtual Disk 266, then Block L would be stored in a location on Physical Storage 230 corresponding to Virtual Disk 266 and Tenant 214 would point to this copy of Block L. However, even if Tenant 216 writes a second, duplicate copy of Block L to Shareable Volume 277 on Virtual Disk 266, the duplicate copy of Block L would be stored in a location on Physical Storage 230 corresponding to Virtual Disk 277 and Tenant 216 would point to the duplicate copy of Block L.

In an embodiment, two or more Tenants point to the same block if two or more Tenants wrote the same copy of the block to volumes designated as deduplication eligible across multiple volumes. For example, if Tenant 210 writes Block M to Shareable Volume 271 created on Virtual Disk 261, then Block M would be stored in a location on Physical Storage 230 corresponding to Virtual Disk 261. At this point, only Tenant 210 would be pointing to Block M. However, if Tenant 212 also writes Block M to Shareable Volume 273 on Virtual Disk 263, then Block M would be identified as a duplicate copy, and thus would not be stored in a location on Physical Storage 230 corresponding to Virtual Disk 263. Rather, Multitenant Storage Program 201 would replace the duplicate copy of Block M with a reference that points to the original copy of Block M previously written by Tenant 210 and stored in a location on Physical Storage 230 corresponding to Virtual Disk 261.

At step 1004, Multitenant Program 201 determines a Tenant storage cost associated with a block stored. In an embodiment, the Tenant Storage cost is calculated based, at least in part, on a fixed price per block stored divided by a number of Tenants pointing to a block. For example, if the price per block stored is X, and four Tenants are pointing to Block N, then the storage cost for a Tenant pointing to Block N would be X/4.

At decision step 1006, Multitenant Program 201 determines whether the number of Tenants pointing to a block has changed. In an embodiment, a change in the number of Tenants pointing to a block is determined based on identifying a change data operation performed on a block. In an embodiment, a change data operation is any operation that causes data to be modified, such as an INSERT, UPDATE, or DELETE operation, or any equivalent operations thereof. For example, if the cost per block stored is X and Tenants 210-216 are pointing to the same copy of Block 0, then the storage cost for each Tenant would be X/4. However, if Tenant 216 issues a delete operation to delete Block 0, then Tenants 210-214 would remain pointing to the copy of Block 0 and Tenant 216 would no longer point to the copy of Block 0. Accordingly, from this point forward, the new storage cost for each of Tenants 210-214 would be X/3 and the new storage cost for Tenant 216 would be zero since Tenant 216 would no longer point to the copy of Block 0.

In another example, if the cost per block stored is X and Tenants 210-216 are pointing to the same copy of Block P, then the storage cost for each Tenant would be X/4. However, if Tenant 210 issues an update operation to update Block P, then Tenants 212-216 would remain pointing to the previous version of Block P and Tenant 210 would now point to the updated version of Block P. Accordingly, from this point forward, the new storage cost for each of Tenants 212-216 for storing Block P would be X/3 and the new storage cost for Tenant 210 for storing the updated version of Block P would be X.

In an embodiment, a change in the number of Tenants pointing to a block is determined based on identifying a WRITE operation/request to write a copy of a block previously written to a volume designated deduplication eligible across multiple tenants and currently written to a storage area of a multitenant environment, such as Physical Storage 230 (depicted in FIG. 2). For example, if Tenants 210-214 are pointing to Block Q, then the storage cost for each Tenant would be X/3. However, if Tenant 216 issues a WRITE operation/request to write Block Q to Shareable Volume 277 on Virtual Disk 266, then Multitenant Storage Program 201 would replace the copy of Block Q written to Shareable Volume 277 with a reference that points to the copy of Block Q stored in a Physical Storage 230. Accordingly, from this point forward, the new storage cost for Tenants 210-216 for storing a single copy of Block Q would be X/4.

In response to determining that the number of Tenants pointing to the block has changed (decision step 1006 "NO" branch), Multitenant Storage Program 201 returns to decision step 1006. In response to determining that the number of Tenants pointing to the block has changed (decision step 1006 "YES" branch), Multitenant Program 201 proceeds to step 1008.

At step 1008, Multitenant Program 201 dynamically adjusts the Tenant storage cost per block for those Tenants pointing to the block. In an embodiment, the Tenant storage cost is dynamically adjusted based on a fixed price per block divided by the new number of Tenants pointing to the block. For example, if Tenants 210 were previously pointing to Block 0, Tenant 216 issued a DELETE operation/request to delete Block 0, and the price per block stored is X, then the new Tenant Storage cost for Tenant 216 for storing Block 0 would be zero. However, if the Tenant storage cost for Tenants 210-216 was previously X/4 when Tenants 210-216 pointed to Block 0, then the new Tenant storage cost for Tenants 210-214 would be X/3.

At step 1010, Multitenant Storage Program 201 generates a total Tenant storage cost for those Tenants pointing to the block prior to the change in the number of Tenants pointing to the block. In an embodiment, the total Tenant storage cost for a block stored is based on an amount of time that a Tenant points to the block multiplied by the block storage cost for a given number of Tenants pointing to the block as calculated in step 1004. It should be appreciated that in various embodiments of the present invention, Multitenant Storage Program 201 can calculate total storage costs at any pre-designated time rate (i.e., the storage cost per block stored may be calculated by the second, minute, hour, day, week, month, or year). For example, if the price per block stored is X per minute and a single Tenant points to Block A for 10 minutes, then this Tenant would be charged 10X. However, if five Tenants point to the same copy of Block A for 10 minutes, then each Tenant would be charged 2X (10X/5 Tenants).

In another example, if the price per block stored is Y per hour, and two Tenants point to the same copy of Block B for 24 hours, then each Tenant would be charged 12Y (24Y/2 Tenants). However, if a First Tenant is points to the copy of Block B for 24 hours, and a Second Tenant points only points to the same copy of Block B for 6 hours, then the First Tenant would be charged 18Y for 18 hours of storing Block B and 3Y (6Y/2 Tenants pointing to Block B) for the 6 hours in which both the First Tenant and the Second Tenant pointed to the same copy of Block B. Similarly, the Second Tenant would also be charged 3Y (6Y/2 Tenants pointing to Block B) for the 6 hours in which both the First Tenant and Second Tenant pointed to the same copy of Block B.

FIG. 11 is a block diagram depicting components of a computing device, generally designated 1100, suitable for executing Multitenant Storage Program 201 in accordance with at least one embodiment of the invention. Computing device 1100 includes one or more processor(s) 1104 (including one or more computer processors), communications fabric 1102, memory 1106 including, RAM 1116 and cache 1118, persistent storage 1108, communications unit 1112, I/O interface(s) 1114, display 1122, and external device(s) 1120. It should be appreciated that FIG. 11 provides only an illustration of one embodiment and does not imply any limitations with regard to the environments in which different embodiments may be implemented. Many modifications to the depicted environment may be made.

As depicted, computing device 1100 operates over communications fabric 1102, which provides communications between computer processor(s) 1104, memory 1106, persistent storage 1108, communications unit 1112, and input/output (I/O) interface(s) 1114. Communications fabric 1102 can be implemented with any architecture suitable for passing data or control information between processor(s) 1104 (e.g., microprocessors, communications processors, and network processors), memory 1106, external device(s) 1120, and any other hardware components within a system. For example, communications fabric 1102 can be implemented with one or more buses.

Memory 1106 and persistent storage 1108 are computer readable storage media. In the depicted embodiment, memory 1106 includes random-access memory (RAM) 1116 and cache 1118. In general, memory 1106 can include any suitable volatile or non-volatile one or more computer readable storage media.

Program instructions for Multitenant Storage Program 201 can be stored in persistent storage 1108, or more generally, any computer readable storage media, for execution by one or more of the respective computer processor(s) 1104 via one or more memories of memory 1106. Persistent storage 1108 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1108.

Communications unit 1112, in these examples, provides for communications with other data processing systems or devices. In these examples, communications unit 1112 can include one or more network interface cards. Communications unit 1112 may provide communications through the use of either or both physical and wireless communications links. In the context of some embodiments of the present invention, the source of the various input data may be physically remote to computing device 1100 such that the input data may be received, and the output similarly transmitted via communications unit 1112.

I/O interface(s) 1114 allows for input and output of data with other devices that may operate in conjunction with computing device 1100. For example, I/O interface(s) 1114 may provide a connection to external device(s) 1120, which may be as a keyboard, keypad, a touch screen, or other suitable input devices. External device(s) 1120 can also include portable computer readable storage media, for example thumb drives, portable optical or magnetic disks, and memory cards. Software and data used to practice embodiments of the present invention can be stored on such portable computer readable storage media and may be loaded onto persistent storage 1108 via I/O interface(s) 1114. I/O interface(s) 1114 also can similarly connect to display 1122. Display 1022 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 12 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
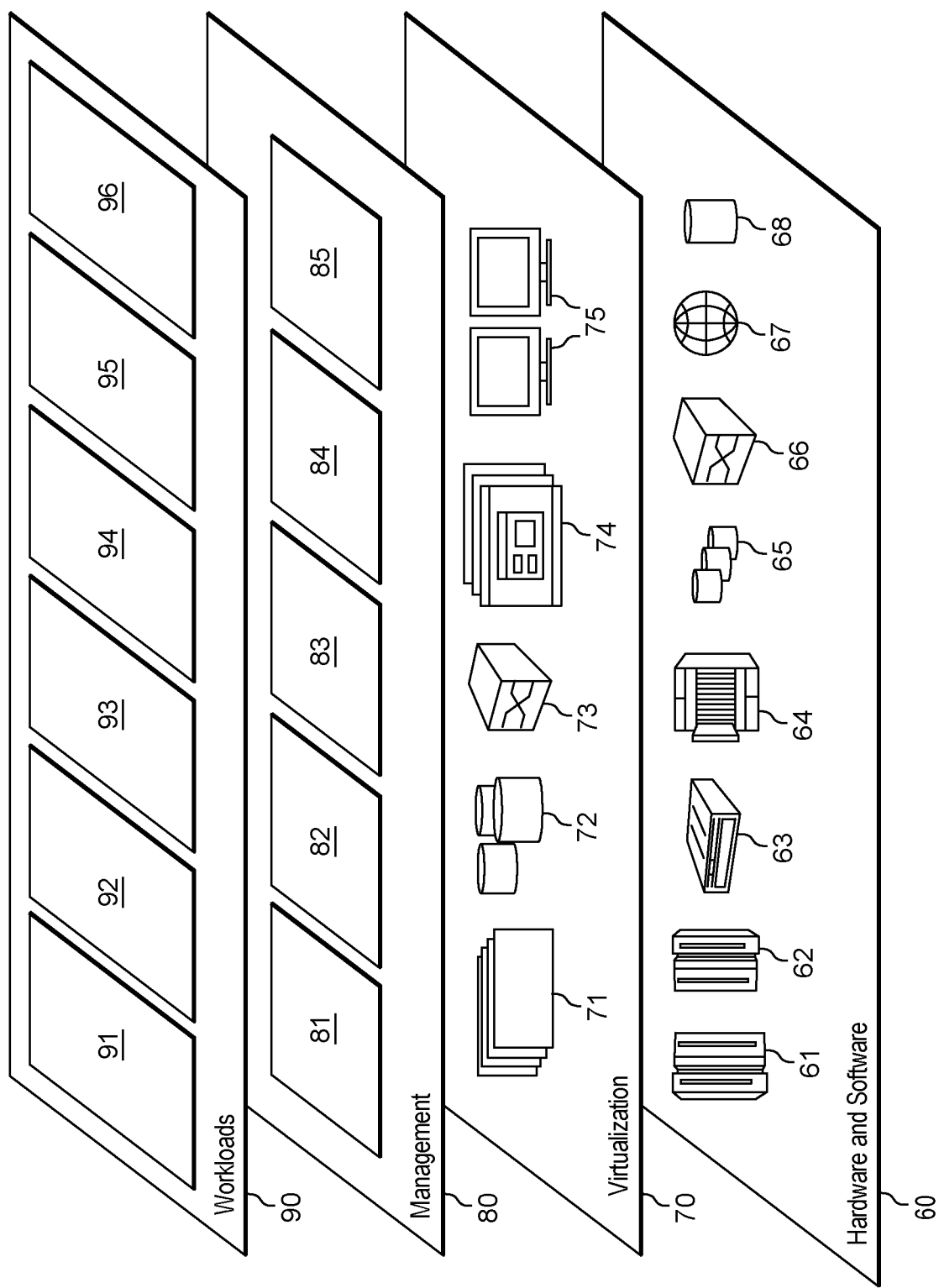
FIG. 13 is block diagram depicting a set of functional abstraction model layers provided by cloud computing environment 50 depicted in FIG. 12 in accordance with at least one embodiment of the present invention.

FIG. 13 is block diagram depicting a set of functional abstraction model layers provided by cloud computing environment 50 depicted in FIG. 12 in accordance with at least one embodiment of the present invention. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective data duplication 96.

What is claimed is:

1. A computer-implemented method for selective data deduplication in a multitenant environment, comprising:
   preventing data deduplication of blocks written to a first storage area associated with a first tenant and redundant copies of the blocks written to other storage areas associated with other tenants based, at least in part, on tagging the first storage area associated with the first tenant with a first parameter; and responsive to detecting a write operation directed to the first storage area tagged with the first parameter:
modifying a block to be written to the first storage area prior to hashing the block.

2. The computer-implemented method of claim 1, wherein modifying the block includes concatenating a tenant identifier associated with the first tenant with the block.

3. The computer-implemented method of claim 2, further comprising:
generating a hash value for the block based on the concatenation of the tenant identifier associated with the first tenant to the block.

4. The computer-implemented method of claim 1, wherein modifying the block includes encrypting the block.

5. The computer-implemented method of claim 4, further comprising:
generating a hash value for the block based on the encrypted block.

6. The computer-implemented method of claim 1, wherein tagging the first storage area associated with the first tenant further includes tagging a volume on a virtual disk created from the first storage area with the first parameter.

7. The computer-implemented method of claim 6, wherein the first parameter indicates that blocks written to the volume on the virtual disk are deduplication ineligible across multiple tenants in the multitenant environment.

8. The computer-implemented method of claim 1, wherein the first storage area associated with the first tenant and the other storage areas associated with the other tenants are part of a shared storage pool.

9. The computer-implemented method of claim 1, wherein the first storage area associated with the first tenant and the other storage areas associated with the other tenants are individual storage pools.

10. A computer-implemented method for selective data deduplication in a multitenant environment, comprising:
permitting data deduplication of blocks written to a first storage area associated with a first tenant and redundant copies of the blocks written to other storage areas associated with other tenants based, at least in part, on tagging a first storage area associated with the first tenant with a first parameter; and
responsive to detecting a write operation directed to the first storage area tagged with the first parameter:
preventing modification of a block to be written to the first storage area prior to hashing the block.

11. The computer-implemented method of claim 10, wherein preventing modification of the block includes preventing a storage controller from concatenating a tenant identifier associated with the first tenant with the block.

12. The computer-implemented method of claim 10, wherein preventing modification of the block includes preventing a storage controller from encrypting the block.

13. The computer-implemented method of claim 10, further comprising:
generating a hash value for the block based on the data contained within the block.

14. The computer-implemented method of claim 10, wherein tagging the first storage area associated with the first tenant further includes tagging a volume on a virtual disk created from the first storage area with the first parameter.

15. The computer-implemented method of claim 14, wherein the first parameter indicates that blocks written to the volume on the virtual disk are deduplication eligible across multiple tenants in the multitenant environment.

16. The computer-implemented method of claim 10, wherein the first storage area associated with the first tenant and the other storage areas associated with the other tenants are part of a shared storage pool.

17. The computer-implemented method of claim 10, wherein the first storage area associated with the first tenant and the other storage areas associated with the other tenants are individual storage pools.

18. A computer program product for selective data deduplication in a multitenant environment, the computer program product including one or more computer readable storage media and program instructions stored on the one or more computer readable storage media, the program instructions including instructions to:
prevent data deduplication of blocks written to a first storage area associated with a first tenant and redundant copies of the blocks written to other storage areas associated with other tenants based, at least in part, on tagging the first storage area associated with the first tenant with a first parameter; and
responsive to detecting a write operation directed to the first storage area tagged with the first parameter:
modify a block to be written to the first storage area prior to hashing the block.

19. A computer system for selective data deduplication in a multitenant environment, comprising:
one or more computer processors;
one or more computer readable storage media; and
computer program instructions, the computer program instructions being stored on the one or more computer readable storage media for execution by the one or more computer processors, and the computer program instructions including instructions to:
prevent data deduplication of blocks written to a first storage area associated with a first tenant and redundant copies of the blocks written to other storage areas associated with other tenants based, at least in part, on tagging the first storage area associated with the first tenant with a first parameter; and
responsive to detecting a write operation directed to the first storage area tagged with the first parameter:
modify a block to be written to the first storage area prior to hashing the block.

20. The computer system of claim 19, wherein the instructions to modify the block further include instructions to concatenate a tenant identifier associated with the first tenant with the block.

21. The computer system of claim 20, further comprising instructions to:
generate a hash value for the block based on the concatenation of the tenant identifier associated with the first tenant to the block.

22. The computer system of claim 19, wherein the instructions to modify the block further include instructions to encrypt the block.

23. The computer system of claim 22, further comprising instructions to:
generate a hash value for the block based on the encrypted block.

24. The computer system of claim 19, wherein the instructions to tag the first storage area associated with the first tenant further include instructions to tag a volume on a virtual disk created from the first storage area with the first parameter.

25. The computer system of claim 24, wherein the first parameter indicates that blocks written to the volume on the virtual disk are deduplication ineligible across multiple tenants in the multitenant environment.

\* \* \* \* \*